INVENTORS
WILLIAM A. GANTZ
RAYMOND B. RUNKLE
BY DONALD F. BUCHLA

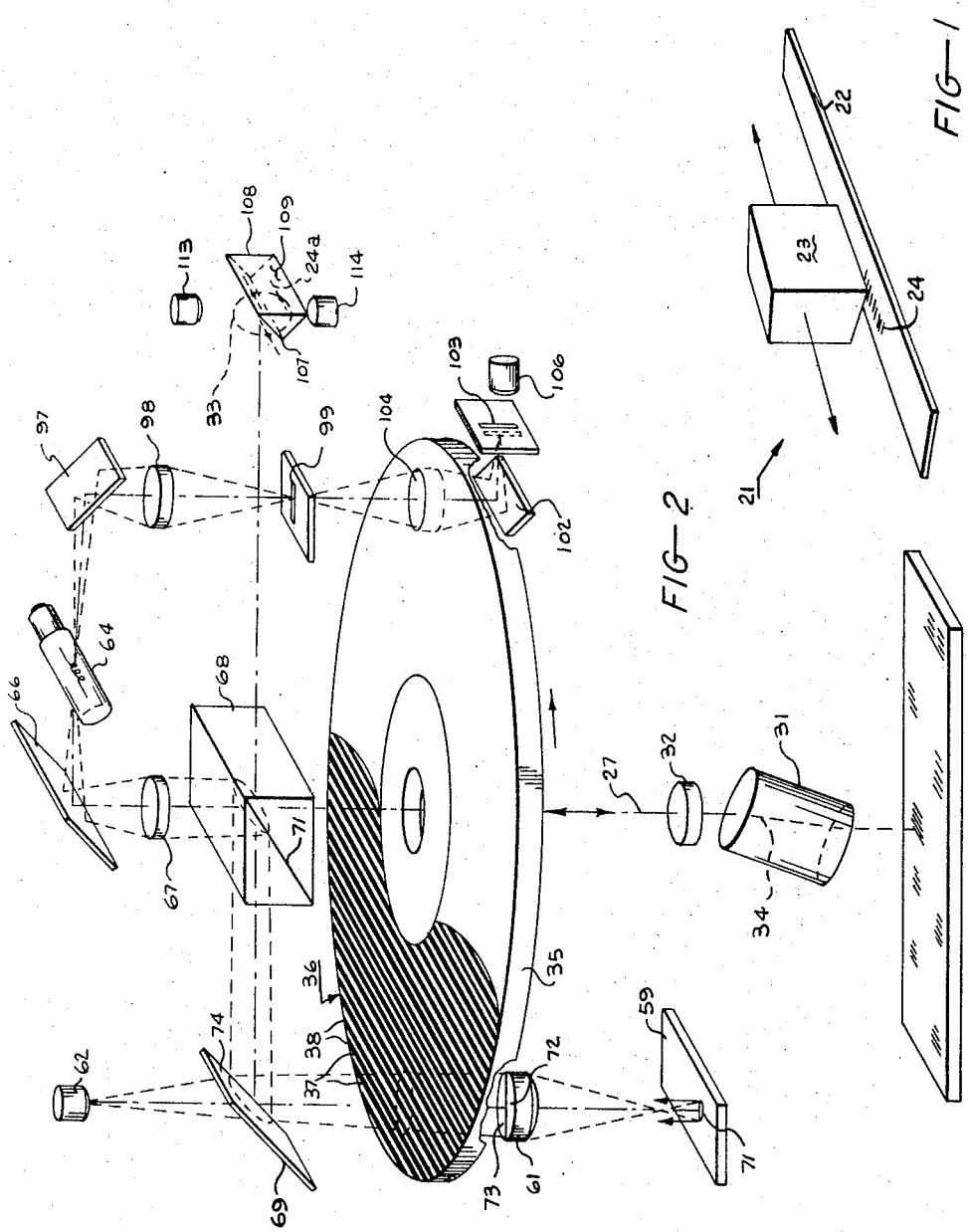

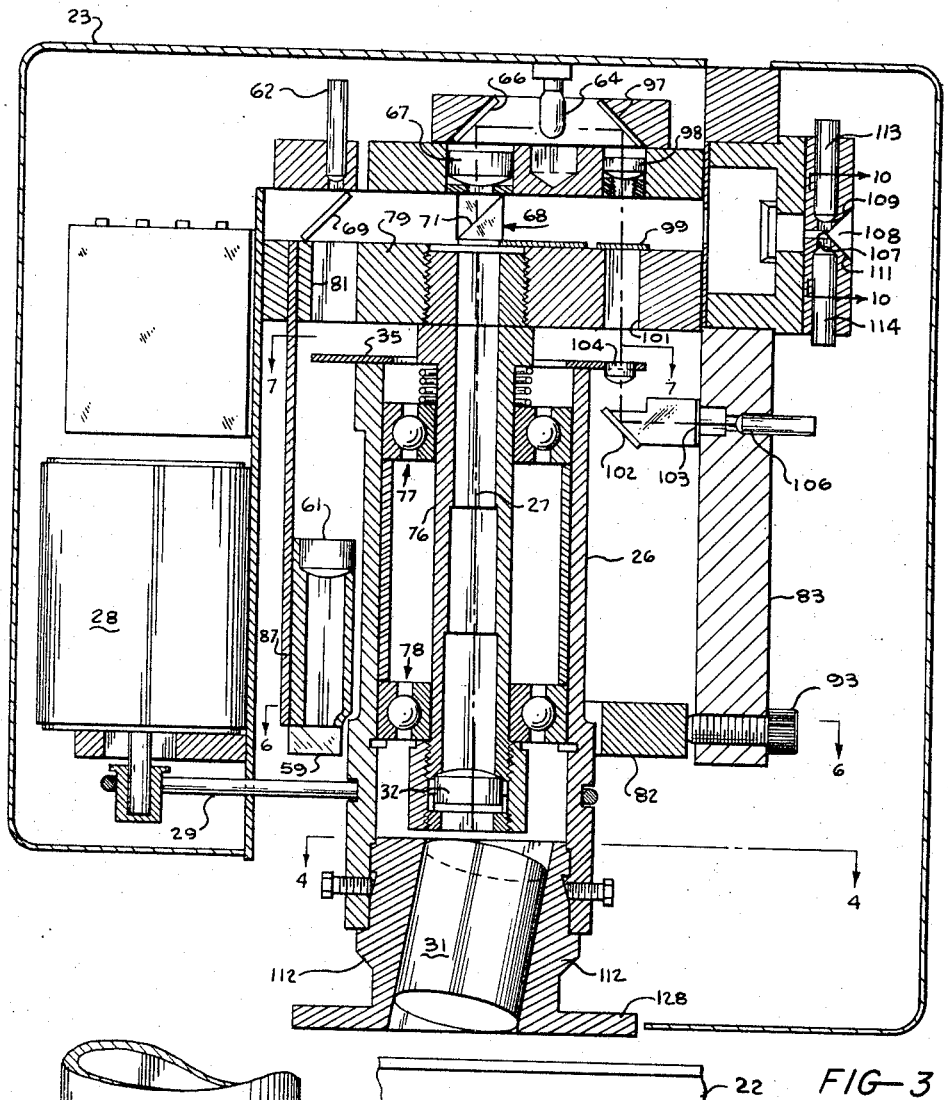
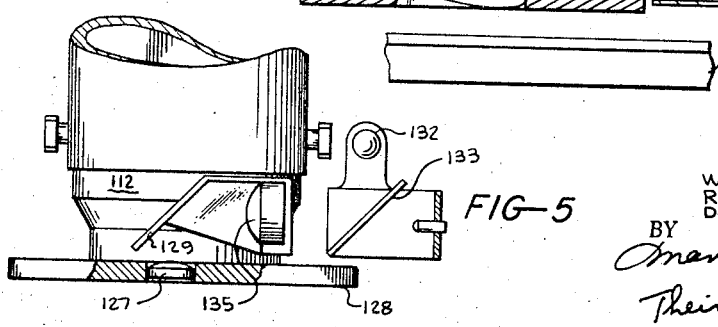
FIG-3
FIG-5
INVENTORS
WILLIAM A. GANTZ
RAYMOND B. RUNKLE
DONALD F. BUCHLA
BY
ATTORNEY

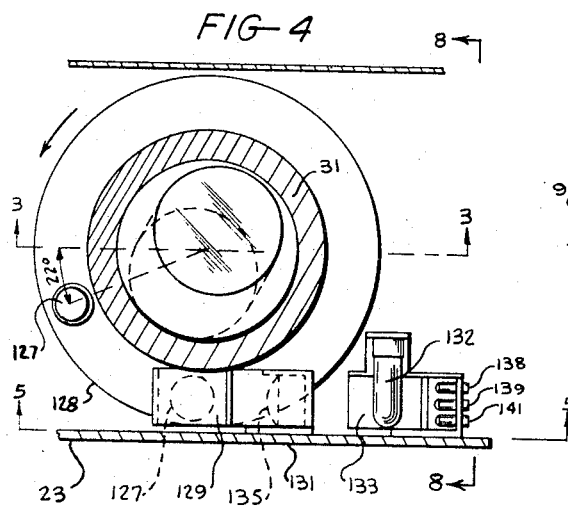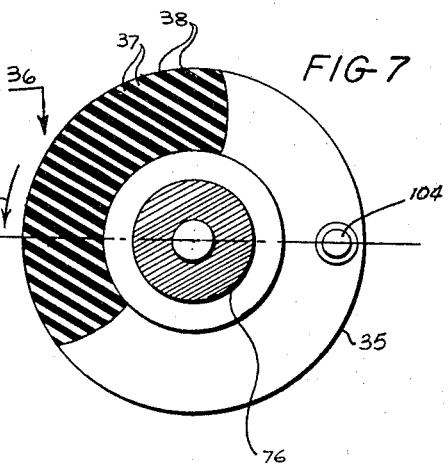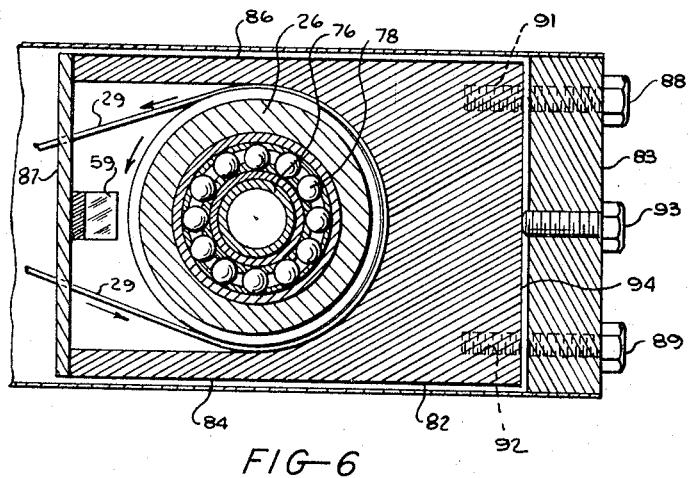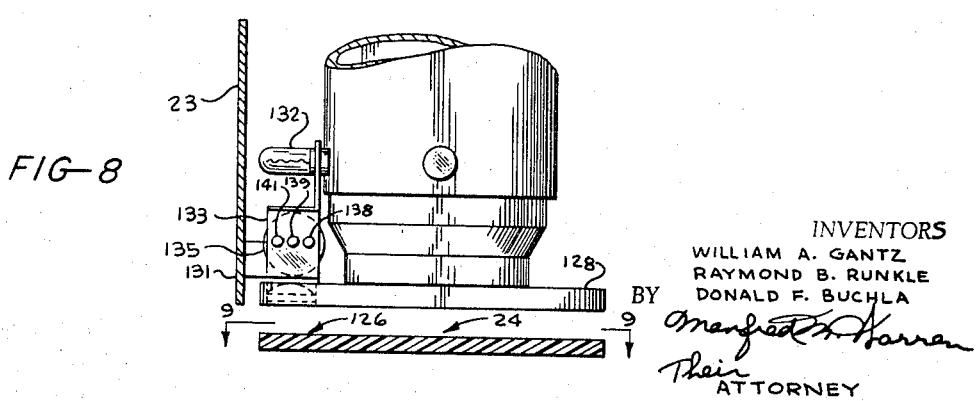

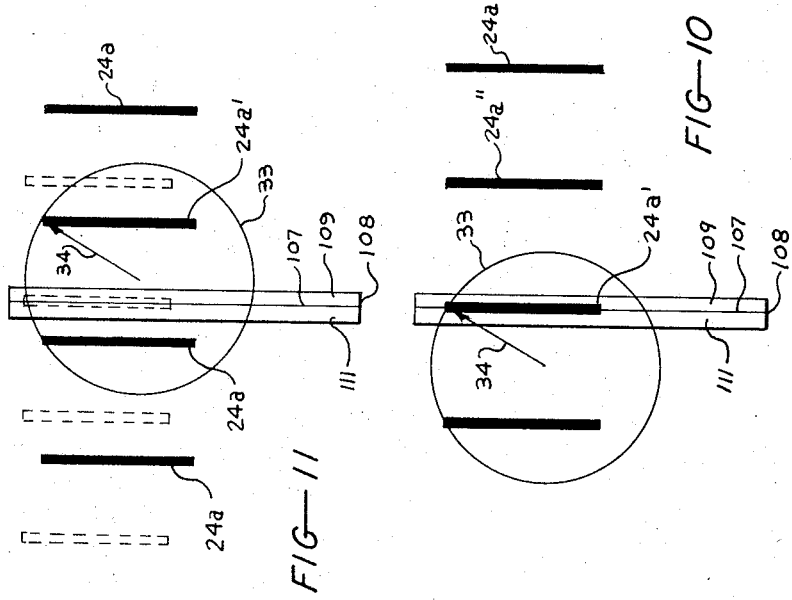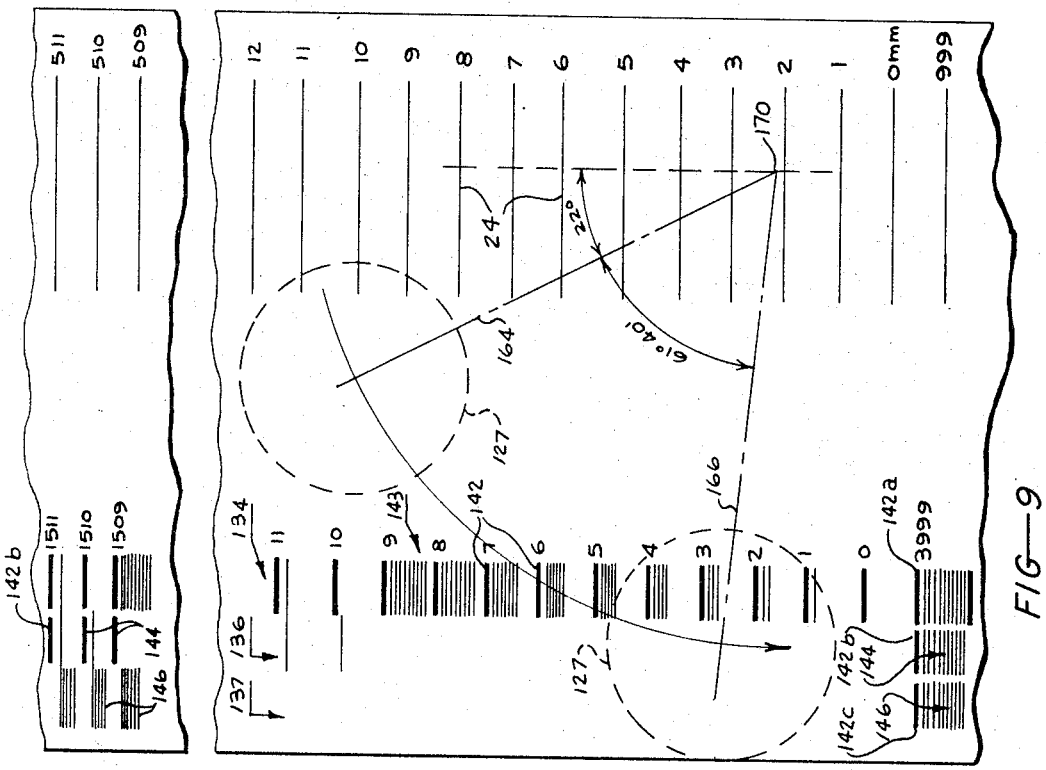

*Their* ATTORNEY

United States Patent Office 3,453,441
Patented July 1, 1969

3,453,441
RADIATION SENSITIVE DIGITAL MEASURING APPARATUS
William A. Gantz, Raymond B. Runkle, and Donald F. Buchla, Berkeley, Calif., assignors, by mesne assignments, to Bausch & Lomb Incorporated, Rochester, N.Y., a corporation of New York
Filed May 25, 1964, Ser. No. 369,759
Int. Cl. G01d 5/36
U.S. Cl. 250—231                     22 Claims

ABSTRACT OF THE DISCLOSURE

A device for determining the position of a sensing head with reference to a linear scale in which the scale is optically read by a circular optical scan in which the interpolation of locations between increments in the scale is indicated in relation to the degree of scan movement relative to the scale increments.

---

This invention relates generally to devices for making precision distance measurements, and more particularly to an apparatus of this type that provides a digital readout of the distance measured.

Precision measuring instruments find widespread utility in various fields. For example, in many machine tool operations it is necessary to position a tool at specified spaced points with greater accuracy than can be achieved by visual perception. In the field of photogrammetry it is necessary to make precise measurements of distances between points on a photograph, this function being of significant importance in nuclear physics research where film exposures of the movement of nuclear particles are made with devices such as the bubble chamber. High accuracy measurements are also required in the inspection of precision parts, where the coordinates of hole centers and other dimensions must be checked for extreme tolerances.

A basic technique for making precision measurements of the type described generally involves mounting some form of measuring head for sensing movement along a given axis. Means are provided to indicate by digital readout or otherwise the exact position of the head in relation to a reference position or scale disposed along the axis of movement. For example, where holes are to be drilled at precise locations on a sheet of material, the material can be clamped securely to a horizontal work surface or table which is constrained to permit movement horizontally in two mutually perpendicular directions, designated as X and Y.

In a typical machine embodiment, the movable table rests on and is guided in the X direction by an intermediate movable carriage or saddle which in turn rests on and guided in the Y direction by a fixed machine base. Relative position or displacement in the X direction may be determined by mounting a measuring head on the table in measuring relationship to a scale on the saddle, or vice versa. Y direction motion may be measured by a scale and head mounted on the base and saddle. As the work surface is moved the measuring heads enable accurate positioning of the drill in relation to the material secured to the work surface. Similar provisions can be made for other tools such as milling machines, jig borers, lathes and the like. Photogrammetric measurements require a similar X-Y machine structure and similar disposition of two sets of heads and scales but in operation, existing features on a photographic film or plate are positioned in coincidence with a fixed optical reference axis by an operator after which X-Y coordinate measurements are made and recorded. In a simple parts inspection arrangement, a single axis measuring device such as a height gauge may be provided with a measuring head attached to the movable element or probe and a scale attached to the fixed column.

Devices heretofore used to perform the above described precise measuring operations have been disadvantageous in various respects. One type is based on an optical system for counting light pulses created by relative movement between gratings. With the latter device one grating is mounted on a measuring head and is movable along an axis on which is disposed a stationary grating. The number of pulses counted as the head moves along the axis indicates the position of the head in relation to the axis. It will be appreciated that the reliability of this system is dependent on memory or storage of the pulses counted during movement of the head. Accordingly, momentary undetected power failures, electrical noises or other extraneous interruptions may cause spurious pulses or missed pulses, which in turn affect the number of pulses stored and cause inaccurate position readings. In addition, inaccuracy may result from traversing too fast thereby exceeding the pulse-counting capacity of the system. In each of these instances position indication depends on the number of pulses counted during movement of the head, and thus it is possible for inaccuracies in positioning to go undiscovered. The nature of this unreliability may require more than one reading to be taken for a given measurement to assure that the reading relied upon is not affected by the described inaccuracies.

By the present invention there is provided a measuring apparatus having a precision of the order of one micron, and which is not subject to the unreliability attributed to memory systems. Rather than basing the position measurement on detecting the extent of movement or traverse of the head, the apparatus of this invention is adapted to provide a direct readout at any position regardless of past events during traverse of the head.

An important object of the present invention is to provide an improved precision measuring apparatus which provides a direct digital indication of a position or distances measured, which is not dependent on detecting or storing indications of movement in relation to the axis of measurement, and which is unaffected by power interruptions or fast traverse.

Another object of the present invention is to provide a compact electron mechanical optical pulse generator in which the pulse rate is proportional to the arithmetic value of the sine of the angular displacement of a rotating element.

Another object of the present invention is to provide a measuring apparatus of the character described which has a greater accuracy than prior devices, and which can be manufactured at a substantially lower cost than other devices of this type.

A further object of the present invention is to provide a measuring apparatus having a measuring head which is mounted for movement in relation to a fixed scale disposed along an axis of measurement, wherein there is no critical mounting relationship between the scale and movable head.

Still another object is to provide a measuring apparatus whose accuracy is readily proved by means of a built-in calibration operating mode, whereby accuracy can be checked and adjusted in a simple and quick manner.

Yet another object is to provide a measuring apparatus wherein the same measuring head is readily interchangeable for use with more than one axis, and wherein the same electronic logic circuitry and digital counter can be used with more than one measuring head to indicate measurements on more than one axis.

Another object is to provide novel means for producing a direct digital representation of the extent of rotational movement of a rotating member.

Another object is to provide a digital measuring apparatus in which any desired figure may be added to or subtracted from the absolute output to adjust the zero datum, regardless of the position of the head relative to the scale; to execute this presetting operation without losing track of the absolute datum; and to permit restoration of the output to the absolute condition at will.

The invention possesses other features and objects of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

FIGURE 1 is a perspective view of a movable measuring head and scale embodying the present invention.

FIGURE 2 is a perspective diagrammatic view of an optical-mechanical scale interpolating system forming a part of an embodiment of the present invention.

FIGURE 3 is a cross sectional side elevation view of a measuring head embodying the present invention.

FIGURE 4 is a cross sectional plan view taken along the plane of line 4—4 as shown in FIGURE 3.

FIGURE 5 is a fragmentary partially cross sectioned side elevation view taken along the plane of line 5—5 as shown in FIGURE 4.

FIGURE 6 is a fragmentary cross sectional plan view taken along the plane of line 6—6 as shown in FIGURE 3.

FIGURE 7 is a fragmentary cross sectional plan view taken along the plane of line 7—7 as shown in FIGURE 3.

FIGURE 8 is a fragmentary end elevation view taken along the plane of line 8—8 as shown in FIGURE 4.

FIGURE 9 is a fragmentary plan view of a scale forming a part of the embodiment shown in FIGURE 1, and is taken along the plane of line 9—9 as depicted in FIGURE 8.

FIGURE 10 is a fragmentary view taken along the plane of line 10—10 as shown in FIGURE 3.

FIGURE 11 is a fragmentary view similar to FIGURE 10.

FIGURE 17b is a diagrammatic representation further explaining the embodiment of FIGURE 17a.

FIGURE 16c is another diagrammatic representation further explaining the embodiment of FIGURE 17a.

Figure 12:
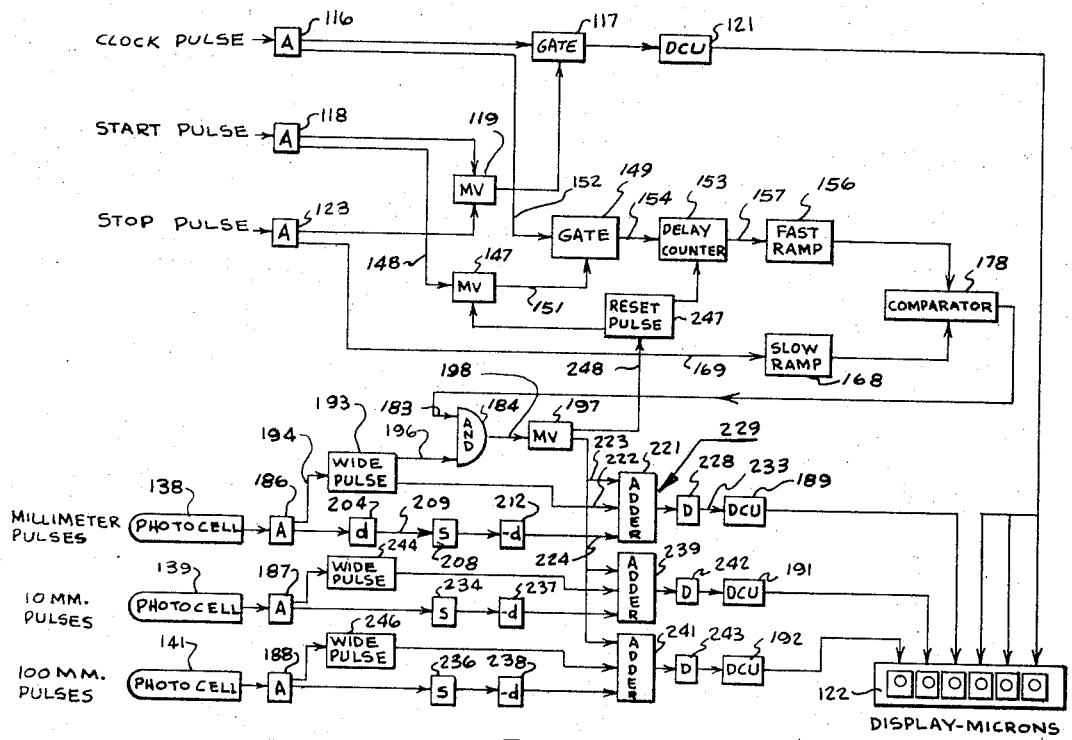
FIGURE 12 is a diagrammatic block diagram of the electronics circuitry and logic system used in conjunction with measuring apparatus embodying the invention.

Measuring apparatus 21 as depicted in FIGURE 1 is seen to include a generally elongated stationary scale member 22 and a measuring head or housing 23 suitably mounted for longitudinal movement in relation to the scale. As best seen in FIGURE 9, the scale 22 includes a first plurality of longitudinally spaced reference marks 24. For purposes of the description herein the marks 24 are described as being spaced one millimeter apart, and are consecutively numbered as a metric scale, although it will be appreciated that the apparatus can be readily adapted for measurements in the English system or with different mark spacing. The housing 23 can be mounted in any conventional manner to accomplish the aforesaid longitudinal movement, as for example by slidable mounting on a longitudinal guide bar or channel.

Each longitudinal position of the housing 23 has a corresponding position on the scale 22, and such position is referred to hereinafter as the scale position of the housing. By ascertaining any given scale position it is possible to indicate the extent of longitudinal traverse of the housing between two scale positions. Consequently, when the housing 23 is associated with a machine tool, probe device, or the like, as described hereinabove, it is possible to measure distances or indicate positions in relation to the scale for the various purposes described.

Apparatus associated with the housing 23 performs two main functions. One of these functions is to measure and indicate precisely the distance between the housing scale position and a proximate reference mark 24. The second function is to indicate or identify which of the marks 24 is the one from which the distance to the scale position is being measured. Preferably, the distance from the scale position is always measured in reference to the lowest numbered of the two marks proximate either side of any given scale position. Thus the first function would be to indicate that the scale position of the housing is, for example, 562 microns away from the lowest numbered proximate mark 24, and the second function would be to indicate that the latter mark is, for example, 11 millimeters away from zero on the scale. In this example the scale position of the housing would be indicated as 0.011562 meter in relation to zero.

The first funtcion just described may be characterized as interpolating the scale position between two spaced reference marks 24. Consequently, the portion of the instant apparatus 21 that performs this first function is denoted herein as a digital interpolator. The term digital is used because the apparatus directly provides a digital representation of the interpolated scale position, which in the above example was 562 microns. The digital interpolator as described hereinafter is adapted to indicate the scale position over a digital range of 1000 microns, which equals the one millimeter spacing of the marks 24, and with an accuracy of ±0.4 micron, which is the limit of resolution presently imposed by the techniques for manufacturing the scale 22. The second function described above is conventionally described as coarse encoding the scale position, and the portion of the instant apparatus that performs this function is denoted as a coarse encoder. It will be appreciated that the precise nature of the instant measuring apparatus depends on the accuracy with which the scale position is interpolated between reference marks, and thus the digital interpolator is the basic component of the apparatus.

Digital interpolator

The digital interpolator of the present invention basically comprises scanning means movably mounted on the housing 23. For any given scale position of the housing 23, the movable scanning means has a range of positions each of which corresponds to a position on the scale and which include first and second positions corresponding respectively to the scale position of the housing and the position of the proximate mark from which the distance to the scale position is to be measured. First and second means are provided to indicate respectively when the scanning means is at each of the aforesaid first and second positions thereof in relation to the housing. Measuring means are provided to determine the extent of movement of the scanning means. Third indicating means, responsive to the first and second indicating means and the measuring means, serves to indicate the extent of movement of the scanning means between its first and second positions. The measured movement of the scanning means between its first and second positions is such as to indicate the longitudinal scale distance between the housing scale position and the proximate reference mark.

In the preferred embodiment of the invention as described herein the movable scanning means consists in a member rotatably mounted on the housing 23, such as the tubular member 26 mounted for rotation about an axis 27 disposed generally perpendicular to the plane of the scale 22. The longitudinal axis of the scale 22, denoted herein as the scale axis, is taken to be a line disposed perpendicularly through the marks 24. The housing 23 is oriented in relation to the scale so that the rotational axis 27 perpendicularly intersects the scale axis. Drive means such as a motor 28, mounted on the housing 23, and a drive belt 29 serve to provide continuous rotation of the scanning member. It will be appreciated that a given point on the scanning member rotating in a circle in a plane parallel to the scale 22 will have a longitudinal component of movement parallel to the scale axis. By determining the extent of rotation of the scanning member 26 it is possible to determine the corresponding component of longitudinal movement of the aforesaid given point thereon. For example, if the rotational movement of the scanning member is measured angularly, then the longitudinal component of movement of the point would be a simple sine function of the angle between a diameter through the point and the transverse axis. It is therefore possible to have rotational positions of the scanning member correspond to longitudinal positions of the given point, which in turn represent a linear function of longitudinal positions and distances on the scale 22.

Thus far reference has been made only to a point on the rotating scanning member, which point has a component of longtiudinal movement parallel to the scale axis as the scanning member rotates. In order to relate the rotational movement of the scanning member to its corresponding longitudinal positions on the scale, an optical system is provided to create an optical image of the scale, which image moves in accordance with the rotational movement of the scanning member. In brief, this is accomplished by means of a tilted refraction member 31 mounted on the bottom of the scanning member 26 for rotation therewith, and a focusing lens 32 disposed to create an optical image of the scale 22 as depicted in FIGURES 2, 10 and 11. The member 31, which as shown is a cylindrical member formed of glass or the like and is disposed with its axis canted at an angle in relation to the rotational axis 27, causes images 24a of the reference marks 24 to move in a generally circular path disposed in an image plane spaced from the scale, with the image marks 24a remaining parallel as the image of the whole scale rotates. The path of the scale image is depicted in FIGURES 10 and 11 by the circle 33, which indicates the path of the upper end of the image mark 24a' for counterclockwise rotational movement of the scanning member as viewed in FIGURES 4, 6 and 7. The marks 24 as shown are generally elongated lines, and longitudinal movement on the scale 22 is perpendicular to these marks. Any point on the scale image corresponds to the aforesaid given point on the scanning member, and the component of movement of the image marks 24a therefore corresponds to the component of movement of the given point parallel to the scale axis. As will be explained, the orientation of the member 31 determines the disposition of the point on the scanning member to which the scale image corresponds.

A stationary point proximate the images 24a is used to denote the rotational position of the scanning member corresponding to the scale position of a reference mark 24. In particular, when the scanning member is disposed so that a given image marke 24a is juxtaposed with this stationary point, the position of the scanning member is denoted as corresponding to the scale position of the particular mark 24 which is imaged at the stationary point. As indicated in FIGURES 2, 3, 10 and 11, the edge 107 of a member 108 mounted on the housing 23 denotes the aforesaid stationary point, the edge 107 being linear and oriented parallel to the image marks 24a. Thus, when an image mark 24a is aligned with the edge 107, the scanning member is in its rotational position corresponding to the longitudinal scale position of the corresponding mark 24. For purposes to be described, this rotational position of the scanning member is denoted herein as its stop position.

The angular position of the scale image in relation to its circular path is depicted in FIGURES 10 and 11 by an arrow 34, which is denoted herein as the scan direction. Considering the path 33 of the upper edge of the image mark 24a' in FIGURES 10 and 11, the scan direction is shown in both these figures as being $+30°$ in relation to a diameter parallel to the image marks. The component of movement of an image mark perpendicular to the edge 107 is a sine function of the angle between the scan direction arrow 34 and the edge 107, or a cosine function of the angle between the arrow 34 and a line perpendicular to the edge 107 which in effect would be an image of the scale axis. The arrow 34 and its movement therefore corresponds to the aforesaid diameter of the scanning member extending through the aforesaid given point thereon.

The optical system just described serves to correlate rotational positions of the scanning member, for any given scale position of the housing, to longitudinal positions on the scale. When a given image mark 24a is aligned with the edge 107, then the rotational position of the scanning member is denoted as corresponding to the particular mark 24 being imaged in alignment with the edge 107. As the scanning member rotates a new image mark 24a eventually will become aligned with the edge 107, and the rotational position of the scanning member will then correspond to the scale position of the new mark 24, which is spaced exactly one millimeter from the mark 24 first imaged at the edge 107. As the scanning member rotates between these two positions in which adjacent image marks 24a are aligned with the edge 107, the scanning member has rotated through a range of rotational positions that correspond to longitudinal positions on the scale 22 between the two marks 24. The spacing of a given scale position from a particular mark 24 therefore is directly proportionate to the spacing between the image of the mark 24 and the edge 107, with the rotational position of the scanning member corresponding to the given longitudinal scale position.

In order to measure the distance of the housing scale position to a proximate reference mark, it is necessary to designate some arbitrary rotational position of the scanning member as corresponding to the scale position of the housing. For reasons to be explained, this arbitrary position is taken herein to be when the scan direction is precisely at $+30°$ as depicted in FIGURES 10 and 11, and is denoted herein as the start position of the scanning member. Whenever the scanning member is in its start position the rotational position thereof corresponds to the housing scale position. Thus, for example, as depicted in FIGURE 10, if the scanning member is in its start position and an image mark 24a is aligned with the edge 107, then the scale position of the housing is exactly on the corresponding mark 24. This is so because by definition the rotational position of the scanning member corresponds to the mark 24 when the image is aligned with the edge 107, and thus the start position as shown coincides with the stop position. If the housing is moved longitudinally in relation to the scale 22 so that the housing scale position is at some point intermeditae two marks 24, then the scale image might be depicted as in FIGURE 11 when the scanning member is at its start position. The image mark 24a' in FIGURE 11 is spaced from the edge 107, which spacing is a linear function of the spacing of the housing scale position from the corresponding scale mark 24. Thus, if the spacing between the edge 107 and image mark 24a' is measured, a determination can be made of the spacing of the housing scale position from the mark 24. That is, if the image mark 24a' is spaced from the edge 107 a distance equal to some fraction of the total spacing between a pair of image marks 24a, then the spacing of the housing scale position from the corresponding mark 24 is exactly equal to this same fraction as taken of the total spacing between a pair of marks 24.

In order to make precise measurements of the housing scale position it is necesary to measure precisely the extent of movement of the scanning member from its start position to its stop position. More particularly, rotation of the scanning member from its start position depicted in FIGURE 11 by the solid line representation of the scale image to its stop position as represented by the dotted lines produces movement of the image mark 24a' exactly equal to the spacing between the latter mark and the edge 107 when the scanning member is in its start position. Accordingly, an important feature of the present invention relates to novel means for measuring and indicating the extent of rotational movement of the scanning member in a manner such that this measurement is directly transplanted into a digital representation of the longitudinal component of movement of the scale image.

In broad terms, a planar clock pulse member 35 is mounted on the scanning member 26 for rotation therewith, and has a plurality of parallel lines 36 provided thereon, at best shown in FIGURES 2 and 7. In the preferred embodiment of the invention the lines 36 are provided as conventional Ronchi rulings, which are adjacent longitudinal regions of equal width and alternatingly transparent and opaque, as depicted by the transparent regions 37 and opaque regions 38. The number of lines 36 that pass a given point on a fixed diameter through the rotational axis 27 for a given increment of rotation is a linear function of the sine of the angle between the lines and this fixed diameter. The number of lines counted for a given increment of rotation depends on the radial position at which the lines are counted relative to the axis 27 of rotation. It will be appreciated therefore that if the angle between the scan direction and the edge 107 is exactly equal to the angle of the lines 36 as just defined, i.e., these angles are in phase as the scanning member rotates, then the number of lines counted will be a linear function of the component of movement of the scale image perpendicular to the edge 107. If the point at which lines are counted is disposed so that exactly 1000 lines are counted when the scanning member moves from one stop position to the next, then the number of lines counted will indicate distances of the housing scale position from a given mark 24 in fractions of 1/1000 of the total spacing between two marks. Since the marks are one millimeter apart, the housing scale position will be determined in microns.

The means of the present invention provided to indicate the number of clock member lines passing a predetermined point is described hereinafter under the heading Clock Pulse System. The means for indicating when the scanning member is in its start position is described under the heading Start Pulse System. The means for indicating when the scanning member is in its stop position is described under the heading Stop Pulse System.

Clock Pulse System

From the foreging it is apparent that precise means must be provided for counting parallel lines that pass a fixed point in relation to the clock member. The principle as described above could of course be embodied into a coarse mechanical system in which the lines are represented by parallel ridges and grooves, and the counting means consists in a detent member positioned to engage and sense each ridge as it passes the detent member. For purposes of making precision measurements, however, such mechanical system would obviously be unsatisfactory. In particular, in order to provide a resolution of one micron in interpolating between the marks 24, it is necessary to count as many as 1000 lines during an increment of rotation of less than 180°. This measurement can be made through the use of an optical system embodying the Ronchi rulings provided on the clock member.

A simple embodiment using the Ronchi rulings would be to provide a light source on one side of the clock member and a photodetector on the other side, with a pinhole aperture disposed between the source and detector to define the point at which the lines are to be counted. Each transparent ruling passing by the aperture would cause an electrical pulse at the detector, thereby indicating one "line." This system has inherent limitations that make it impractical for use in high precision measurements. Because the aperture must be extremely small, a speck of dirt on a transparent ruling, or a minute scratch in an ouaque ruling making it transparent, could cause inaccurate pulse counts.

Figure 14:
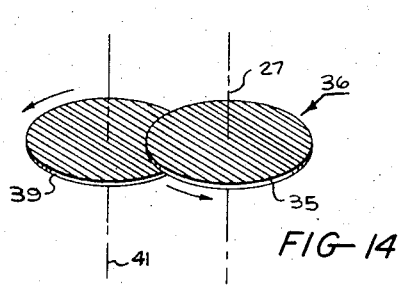
FIGURE 14 is a diagrammatic representation of a pulse generator embodying the invention.

An embodiment remedying the defect noted with the pinhole aperture could consist in a slit aperture that would align with the length of a transparent region, rather than with a minute point thereof. A slit aperture presents a problem, however, in that as the clock member rotates so does the angular position of the lines, and therefore the slit aperture would have to be rotated so that it always was parallel to the lines. This system could be provided by a second rotating member having the exact same Ronchi ruling pattern thereon, and disposing the second member so that it overlapped the clock member and so that the lines are parallel. This arrangement is illustrated diagrammatically in FIGURE 14 wherein the clock member 35 is shown to be rotatable about its axis 27 in the direction indicated by an arrow. The second member is indicated by the number 39, and is shown as being rotatable about an axis 41 in the direction indicated by an arrow. With both the members 35 and 39 rotating in the same direction as shown, and at the same speed, there periodically will occur an overlap of transparent regions on both members, and then overlap of opaque regions on one member with transparent regions of the other. The lines on the two members move transversely across one another to create this shutter effect. Light transmitted through the two members each time transparent regions overlap represents a "line," and the position of the axis 41 determines the number of "lines" on the clock member 35 counted for a given increment of rotation. It will be noted that as the axis 41 is moved radially closer to the axis 27, the number of lines counted decreases. This result in analogous to moving the aforesaid pinhole aperture radially in relation to the axis 27, and in effect the axis 41 corresponds to the disposition of such pinhole aperture A practical embodiment of the system represented in FIGURE 14 and as just described presents a problem in that a highly precise gear synchronizing system must be utilized to provide the necessary movement of the two rotating members. In addition to the expense of such a mechanical system, the accuracy provided thereby would be inferior to the optical pulse forming shutter systems described hereinafter.

An important feature of the present invention relates to the provision of optical means for performing the function of the second member 39, but which requires no mechanical moving components other than the clock member 35 itself. Basically, the instant optical shutter system consists in means for superimposing an image of the clock member 35 on top of the member 35, but with the image taking the place of the second member 39. The rotates in exact synchronization with the clock member, but with the superimposed image lines moving transversely to the lines themselves in the same manner as the relative movement described above with regard to members 35 and 39 in FIGURE 14. As the images of the transparent regions are superimposed over the opaque regions on the member, no light is transmitted through the member. When the images of the transparent regions align exactly with the transparent regions then the light transmitted through the clock member is a maximum.

Figure 15:
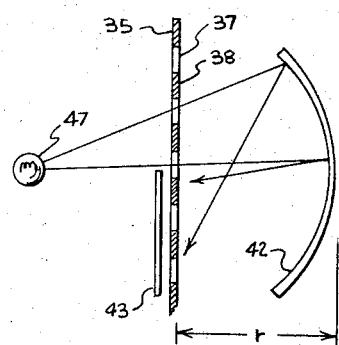
FIGURE 15 is a diagrammatic representation of an optical system comprising an alternative embodiment of a pulse generator for use with the instant measuring apparatus.

A basic embodiment of the optical system just described is shown in FIGURE 15 wherein a spherical concave reflecting surface 42 is spaced from a photodetector 43. The clock member 35 is represented as being interposed between the detector 43 and the surface 42, and spaced from the latter surface at a distance r equal to the radius of curvature of this surface. The member 35 is seen to have alternating opaque regions 38 and transparent regions 37 as described. A light source 47 is positioned coaxially with the spherical surface as shown, with the detector blocking half the cone of light from the source. The remaining half cone of light is directed above the detector as shown and through the clock pulse member transparent regions onto the surface 42. The spherical surface 42 serves to form an image of the transparent regions along a plane superimposed with the portion of the clock member confronting the detector 43. As the clock member rotates, the images of the transparent regions as defined by the light from the source 47 move transversely to the regions themselves, in the manner described above with reference to FIGURE 14. As the images of the transparent regions align with the transparent regions the detector 43 indicates by an electrical pulse the light from the source 47 that is transmitted back through the member 35. Continuous rotation of the clock member causes periodic pulses of light indicated by the detector 43, which pulses correspond precisely to the number of transparent regions passing a line disposed perpendicular to the surface 42 and to the plane of the clock member 35. These pulses are denoted herein as clock pulses.

Figure 16:
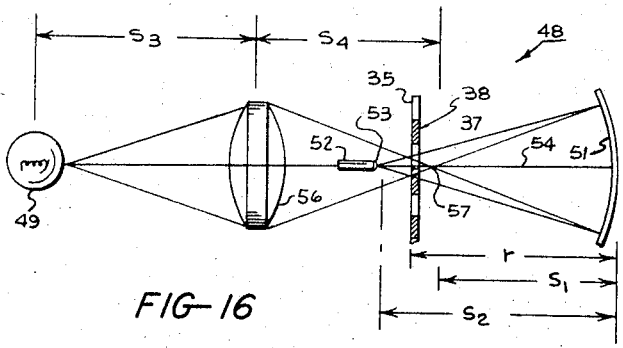
FIGURE 16 is a diagrammatic representation of an optical system comprising another alternative embodiment of a pulse generator used with the instant measuring apparatus.

An alternative optical system 48 is disclosed to FIGURE 16, wherein the full cone of light from a source 49 is utilized, as opposed to discarding half of it as in the embodiment shown in FIGURE 16. In the system 48 a concave spherical reflective surface 51 again is spaced from the member 35 a distance r equal to the radius of curvature, with a photodetector 52 positioned on the other side of the member 35 to detect light focused at a point 53 disposed at a distance r equal to the radius of curvature, with a photodetector 52 positioned on the other side of the member 35 to detect light focused at a point 53 disposed at a distance $S_2$ from the surface 51 and along an axis 54 of a focal lens 56 disposed on the other side of the detector. Light from the source 49, which is spaced a distance $S_3$ from the lens 56, is focused at a point 57 spaced a distance $S_4$ from the lens, assuming the source to be concentrated at a point. The distances $S_3$ and $S_4$ are related to the focal length (FL) of the lens by the formula $$\frac{1}{S_3}+\frac{1}{S_4}=\frac{1}{FL}$$

The focal point 57 is spaced a distance $S_1$ from the surface 51, and the positioning of the detector 52 at the point 53 is determined by the formula $$\frac{1}{S_1}+\frac{1}{S_2}=\frac{2}{r}$$

The system 48 forms an image of the clock member to be superimposed on the member itself, in the manner described hereinabove, and the detector 53 produces clock pulses in accordance with the pulses of light transmitted through the clock member from the surface 51 as created by the shutter action of the superimposed image.

While the system 48 utilizes a point photodetector 52 instead of a surface detector 43 as shown in FIGURE 15, this system also must use a concave reflector. A preferred optical system 58 is depicted diagrammatically in FIGURE 17a and is seen to include a planar reflective mirror surface 59 spaced from the clock member 35, with a focal lens 61 interposed between the reflective surface and clock member. A detector 62 and light source 63 are positioned on the other side of the clock member as shown, with the source spaced a distance $S_1$ from the lens and the detector a distance $S_2$. The lens is spaced a distance L from the clock member, and a distance M from the mirror. System 53 is shown again in FIGURE 17b, unfolded about the plane of the mirror 59. Dimension L represents the optical distance from the lens 61 to the focused filament image x and dimension $L_2$ is the distance from the focused image x to lens 61a. Note that lens 61a is physically the same as lens 61. Note also that $2M = L + L_2$. If the distance L is equal to the focal length F of the lens 61, then an image of the clock member will be superimposed thereon in the manner described above, regardless of the distance M of the mirror. The position of the detector 62, which detects the focused image of the source 63, depends on the positioning of the mirror and is determined by the formula $$M=\frac{1}{2}\left(\frac{FS_1}{S_1-F}\right)+\left(\frac{FS_2}{S_2-F}\right)$$

Figure 17A:
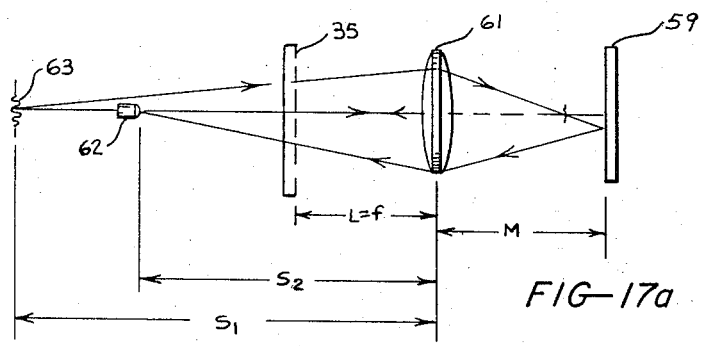
FIGURE 17a is a diagrammatic representation of an optical system comprising another alternative embodiment of a pulse generator used with the instant measuring apparatus.
Figure 17B:
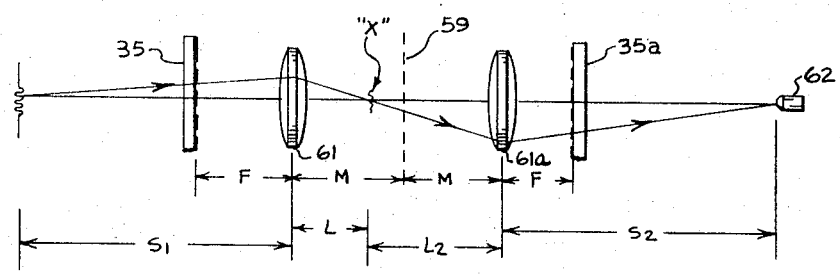
Figure 17C:
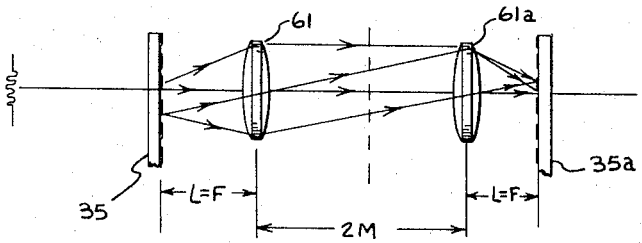

FIGURE 17c shows how the disc 35 is refocused on itself (represented by disc 35a), by virtue of the fact that $L=F$.

The system 58 as embodied into the instant digital interpolating apparatus is best described with reference to FIGURES 2 and 3. A light source 64 is mounted on the housing 23, and a portion of the light therefrom is directed toward mirror 66 which directs this portion of light coaxially with the tubular member 26 toward the scale 22. A condensing lens 67 concentrates the light reflected from the mirror 66, and a prismatic beam splitter 68 intercepts the light to divert a portion thereof in a radially outward direction toward another mirror 69. The splitter 68 consists of a pair of triangular prisms placed together to define a diagonally disposed light splitting surface 71 which functions in a manner similar to that of a half-silvered mirror. A half-silvered mirror or a coated type of beam splitter work equally well. The remaining portion of the light is directed through the focusing lens 32 and the tilted plate 31 onto the scale 22, and the function thereof is described hereinafter under the heading Stop Pulse System. The mirror 69 is positioned to intercept half the cone of light diverted by the beam splitter 68, and reflects this intercepted light toward the clock member 35. A focusing lens 61 and a planar mirror 69 are mounted on the housing 23 and positioned on the other side of the clock member 35 as described hereinabove with reference to FIGURE 17. The lens 61 and mirror 59 cause the clock member to be imaged on itself as already described, and the light transmitted back through the clock member when the images of the transparent regions overlap the latter is directed generally toward the mirror 69. The mirror 69 is positioned so that it reflects light only toward half of the lens 61, and the light focused by the lens 61 on the mirror 59 is represesnted by the generally semicircular area 71 depicted in FIGURE 2. This segment of light is indicated in FIGURE 2 also by area 72 of the lens 61. When this segment of light is reflected from the mirror back through the lens 61 it travels through the area 73 thereof, and hence when it passes back through the clock member 35 it passes by the edge 74 of the mirror 69 instead of being intercepted thereby. The detector 62 is mounted on the housing 23 to detect the light that travels past the mirror 69. It will be appreciated that the system 58 as embodied in the apparatus shown in FIGURES 2 and 3 is in substance the same as that shown diagrammatically in FIGURE 17a with the only important difference being the addition of the mirror 69. The latter mirror in effect enables light to be introduced into the system from a radial direction relative to the clock member, as opposed to a direction perpendicular to the clock member as depicted in FIGURE 17. Insofar as the splitter 68 and mirror 66 are concerned, it need only be noted that the source 64 must be positioned a total distance $S_1$ from the lens 61, in accordance with the formula set forth hereinabove with regard to FIGURE. 17.

As regards the details of the structure embodying the instant clock pulse system, a central tubular support member 76 is secured rigidly to the housing 23, with the tubular scanning member 27 being concentrically disposed around the support member 76 and mounted for rotation thereon by means of spaced bearings 77 and 78. A transversely disposed stationary portion 79 of the housing 23, from which the tubular member 76 depends, is seen to have a bore 81 through which passes light directed through the clock member in both directions. For purposes of calibrating the clock pulse system, in a manner to be described, it is preferred that the positioning of the clock lens 61 and mirror 69 be adjustable in relation to the clock member 35. Briefly, adjustment of the radial and rotational position of this lens and mirror serves in effect to adjust the aforesaid point at which the clock member lines are counted. In this regard, a U-shaped member 82 is shown in FIGURES 3 and 6 as being secured to a portion 83 of the housing 23, and including a pair of bifurcated arms 84, 86 spaced around the scanning member 26. A member 87 is secured to the ends of the arms 84, 86, with the lens 61 and mirror 59 being mounted on the member 87. The U-shaped member 82 is mounted on the housing portion 83 by means of a spaced pair of bolts 88, 89 threadedly extending into bores 91, 92 in the member 82, and a central bolt 93 threadedly mounted on the portion 83 in abutting relation with the edge 94 of the member 82. By tightening one of the bolts 88, 89, and loosening the other, the U-shaped member can be in effect pivoted about the bolt 93 to effect critical adjustment of the rotational position of the lens 61 and mirror 59 in relation to the axis 27. Adjustment of the central bolt 93 varies the radial position in relation to the axis 27.

The axis of the clock lens 61 is seen to be disposed to intersect a diameter through the axis 27 generally parallel to the axis of the scale 22, depending on the adjustment of the U-shaped member 82 as described. The pulses produced by the clock pulse optical system correspond to the lines represented by transparent regions that pass the clock lens axis. It will be appreciated that a complete scan of the longitudinal scale position between two reference marks must be accomplished within 180° of rotation of the scanning member. It is desirable, however, that lines are not counted at either extreme of the 180° segment, since the rate of count for constant rotational speed approaches zero and the large differential in count rate would tend to emphasize any error in the above described phase relationship between the scan direction and the pulse count. Consequently, as indicated in FIGURE 7, the lines 36 defined by the alternate transparent and opaque regions 37 and 38 are provided only on an angular segment of the clock member 35 of substantially less than 180°. As will be described, in the illustrated embodiment of the invention pulses are counted only within a predetermined 60° segment of the clock member's movement during its normal operating mode.

Start Pulse System

Indicating means is provided to determine when the scanning member is in its start position as described above, and include a mirror 97 mounted on the housing and positioned to direct light from the source 64 through a condensing lens 98 towards a slit aperture 99 provided on the housing 23, as shown in FIGURES 2 and 3. Light passing through the slit 99 is directed through a bore 101 in the housing portion 79 toward another mirror 102 mounted on the housing 23 and positioned to direct light from the slit 99 radially outwardly towards a second slit 103 provided on the housing. A focusing lens 104 is mounted on the scanning member for rotation therewith along a path that passes between the slit 99 and mirror 102. As shown, the focusing lens 104 is mounted in a bore on the clock member 35 and is rotationally positioned thereon so that when the scanning member is in its start position the lens 104 forms an image of the slit 99 which is in exact registration with the second slit 103. A photodetector 106 is mounted on the housing 23 and disposed behind the slit 103, and is adapted to detect the focused light defining the image of the slit 99 as it passes through the slit 103. The electrical pulse formed by the detector 106 indicates that the scanning member is in its start position, and is denoted herein as the start pulse.

Stop Pulse System

The stop pulse system serves to indicate when the scanning member is in a rotational position corresponding to the longitudinal position on the scale 22 of the mark 24 proximate one side of the housing scale position, which, as described above is denoted as the stop position of the scanning member. The scanning member is in its stop position, when an image mark 24a is juxtaposed with a predetermined stationary point relative to the housing, which as indicated is demarked by the edge 107 of the triangular member 108 mounted on the housing 23. The member 108 has a pair of reflective surfaces 109 and 111 that intersect along the edge 107.

The means for forming the images 24a include the focusing lens 32, which as shown is mounted adjacent the bottom end of the tubular member 76. The tilted refracting plate 31 is mounted on a member 112 secured adjacent the lower end of the rotating member 26, and is interposed between the lens 32 and the scale 22. The portion of light transmitted straight through the aforesaid beam splitter 68 is directed through the tubular member 76, lens 32, and plate 31, onto the scale 22. In the preferred embodiment of the invention as disclosed herein, the reference marks 24 are provided as reflective marks on a nonreflective background, so that light from the source 64 is reflected off of the marks 24. The light reflected from the marks 24 is directed back through the lens 31 and 32, and is incident upon the surface 71 of the beam splitter 68, which directs a portion of the light radially toward the triangular member 108. The focusing lens 32 and the member 108 are positioned so that the image plane of the scale 22 is adjacent the member 108 as described. A pair of photodetectors 113 and 114 are mounted on the housing 23 and positioned respectively confronting the reflective surfaces 109 and 111 of the member 108. When an image mark 24a, representing the light reflected from a mark 24, is aligned with the edge 107, the light is reflected evenly off of the two surfaces 109 and 111 so that the detectors 113 and 114 each produce the same intensity electrical pulse. Suitable electronic means is provided in connection with the detectors 113 and 114 to produce an electrical pulse when there is a null or balanced reading on the two detectors. This latter pulse is denoted as the stop pulse, and indicates that an image mark 24a is aligned with the stationary point denoted by the edge 107.

Interpolator logic system

The scanning member is continuously rotating, and clock pulses are continuously being produced by the detector 62 as the rulings 36 pass through the clock pulse system. As indicated in the block diagram of FIGURE 12, pulses from the clock pulse detector 62 are fed to an amplifier 116, which feeds these pulses to a gate 117. When the scanning member passes its start position, the start pulse created by the start pulse detector 106 is fed to an amplifier 118, which feeds to a bistable multivibrator 119 and causes it to open the gate 117. When the gate 117 is open the clock pulses are fed to a decimal counting unit 121, which counts the pulses and feeds to a digital display unit 122. When the scanning member passes its stop position, the stop pulse created by the stop pulse system is fed to an amplifier 123, which feeds to the multivibrator 119 and causes it to move back to its first position thereby closing the gate 117. The number of clock pulses counted in the interim between start and stop pulses provides a digital representation of the scale distance between the housing scale position and the scale mark 24 proximate one side thereof.

Calibration

In the preferred embodiment of the invention as described above, the lines 36 are counted in effect as they pass the axis of the clock lens 61, which represents a point disposed along the scale axis at particular radial distance from the rotational axis 27. Thus, as noted, the number of lines counted is a linear function of the sine of the angle between the lines and the longitudinal scale axis. If the angle between the scan direction and the edge 107 is in phase with the angle between the lines and scale axis, then the number of lines counted is a linear function of the distance between the edge 107 and the image marks 24a.

The tilted plate 31 as shown is a cylindrical member having its axis disposed at an angle to the rotational axis 27 and in a plane containing a diameter perpendicular to the lines 36. If the latter plane is exactly perpendicular to the lines 36, and if the clock lens axis is exactly aligned with the scale axis, then the clock pulses and scan direction will be exactly in phase. As will be shown, however, the mounting of the eccentric plate 31 is not critical, since the phase relationship can be controlled by adjustment of the rotational position of the clock lens axis by means of the aforesaid U-shaped member 82.

To determine the phase relationship, it is necessary to employ a slight modification in the electronics logic system, placing the latter in what may be designated as the calibrating mode as opposed to the operating mode. In the calibarting mode, the start pulse system is taken out of operation, and circuitry is used to trigger the multivibrator 119 upon indication of a stop pulse, thus opening the gate 117 to begin counting clock pulses. The calibrating mode circuitry is further adapted to trigger the multivibrator 119 in the normal manner upon receipt of the next or second stop pulse, thus closing the gate 117. In the calibration mode, therefore, the stop pulse both starts and stops the counting of clock pulses, so that the number of pulses counted should equal the spacing between two marks 24, viz. 1000 microns.

If the clock system and scan direction are out of phase, then the number of pulses will vary for different positions of the housing relative to the scale. As the housing is moved, the rotational axis 27 also moves relative to the scale, and thus the image marks will cross the edge 107 at different rotational positions of the scanning member for different scale positions of the housing. In order to bring the apparatus into phase, it is necessary to make adjustment of the rotational position of the clock lens axis by means of the bolts 88, 89, so that regardless of where the housing is positioned on the scale the same pulse count occurs during the calibration mode.

When the system is in phase, it then is necessary to calibrate to achieve exactly 1000 pulses as representing rotational movement between stop pulses. This step is accomplished by adjusting the radial position of the clock lens axis, decreasing the radius serving to decrease the count, and increasing the radius increasing the count. It may be necessary to check the phase again after the radial position is calibrated, to assure that it is not altered. It presently is contemplated that adjustment means other than the U-shaped member 82 may serve to perform the calibration adjustments of the position of the clock lens axis. For example, rotational adjustment of the eccentric plate 31 relative to the clock disc would serve to adjust the phase relationship, and adjustment of the angle of tilt of the plate 31 would serve in effect to vary the radial position of the clock lens axis.

By adjusting the start pulse system to produce the start pulse when the scan direction is at +30°, the clock pulses are counted over a range in which the nonlinearity in pulse count rate is kept to a minimum. In this regard, it is preferred that the full range of pulse counting occur within movement of the scan direction from +30° to −30°. That is, if the housing scale position is at 999 microns from the lowest numbered proximate mark 24, then the stop pulse will be produced approximately when the scanning member has rotated 60° from its start position and when the scan direction s at approximately −30°.

To accomplish the pulse counting wihtin this range of 60°, it is necessary to cant the angle of the axis of the tilted plate 31 in relation to the axis 27 so that the radius of rotation of the scale image is approximately equal to the spacing between the image marks 24a. In this manner, 60° of rotation of the scanning member from its start position will cause the image marks 24a to move approximately the distance between image marks. For example, the scale image as shown in FIGURE 10 is disposed with the mark 24a' aligned with the edge 107. After the image rotates 60° the mark 24a'', shown to the right of the mark 24a', will be aligned with the edge 107.

It is not critical that the radius of scale image rotation be exactly equal to the image mark spacing, and no error results if the range of scan deviates from 60°. The only critical relationship is in the phasing and calibrating so that 1000 pulses are produced in a scan between image marks. No loss in accuracy results if 1000 pulses are produced in a scan of 59° or of 61°.

Although the operating mode requires that 1000 pulses be counted only during a 60° scan commencing at the start position, it is necessary for the calibrating mode that pulses are counted over a wider scan range. Consequently, as depicted in FIGURES 2 and 7, the lines 36 are provided on the clock member over an angular segment of about 150°. In this manner, it is possible to count 1000 pulses commencing with a scan direction anywhere in the range of about +75° to −15°.

When the lens 31 and start pulse systems are suitably adapted to scan 1000 pulses between scan direction of +30° and −30° it will be noted that the housing scale position can be easily identified in relation to the scanning member's axis of rotation 27. More specifically, the housing scale position is approximately one-half millimeter from the position on the scale at which the axis 27 intersects the scale axis. For example, and as seen in FIGURE 9, if the rotation axis 27 intersects the scale at 5.500 millimeters then the housing scale position is 6.000 millimeters. This relationship exists because when the axis 27 is at the midpoint between the marks 24 denoted as 5 millimeters and 6 millimeters, then the 6 millimeter mark 24 is imaged at the edge 107 when the scanning member is in its start position. As the housing is moved on the scale so that the axis 27 moves toward the 6 millimeter mark, then the image of the latter mark becomes proportionately spaced from the edge 107 when the scanning member is in its start position, as generally depicted in FIGURE 11. Thus when the axis 27 is aligned with the 6 millimeter mark, the true housing scale position is about 6.500 millimeters, and thus the image of the 6 millimeter mark will be spaced from the edge 107 about one-half the distance between adjacent image marks. It is again noted that the above relationships are not necessarily precise, since it is not critical to the system's accuracy that the radius of scale image rotation be exactly equal to the spacing between image marks, or that a scan of 1000 pulses occur between symmetrical angular dispositions of the scan direction on either side of 0°.

Coarse encoder

From the foregoing it is apparent that the digital interpolater portion of the instant apparatus enables the housing scale position to be ascertained precisely in relation to the lowest numbered mark 24 proximate the housing position. For full utilization of the instant apparatus it is further necessary to provide means for readily and quickly indicating, also in digital form, the mark from which the housing position is measured.

Accordingly, a coarse encoder is provided as a part of the present invention and includes a second plurality of reference marks 126 disposed on the scale 22 alongside the marks 24, as shown in FIGURE 9. A focusing lens 127 is mounted on the scanning member for rotation therewith, and moves in a circular path passing over the marks 126 in confronting relation therewith. In broad terms, each of the marks 126 provides a representation of one of the marks 24 for identification thereof, and the lens 127 forms a part of means for detecting the marks 126. Logic means are coupled to the clock pulse system of the digital interpolator for determining which of the marks 126 detected by the lens 127 correspond to the correct mark 24, and indicating means coupled to the detecting means serves to translate the detected marks 126 into a digital representation of the mark 24.

In more detail now, as best seen in FIGURES 4, 5 and 8, the lens 127 is mounted on a flange 128 provided on the member 112. A mirror 129 is mounted on a side wall 131 of the housing 23 in a position disposed above the coarse scale marks 126, and the lens 127 is adapted to pass between the mirror 129 and the marks 126. A light source 132 is mounted on the housing 23 and positioned to direct light downwardly towards a half-silvered mirror 133 which reflects a portion of the source light towards the mirror 129. The latter mirror in turn reflects the light downwardly towards the marks 126, so that when the lens 127 passes thereunder the latter marks are illuminated. A condensing lens 135 is secured to the housing 23 and interposed between the mirrors 129 and 133.

The marks 126 preferably are provided as reflective marks on a nonreflective background, and include three individual longitudinal scales 134, 136, and 137. The scale 134 serves to indicate the millimeter digit; the scale 136 represents the ten millimeter digit; and the scale 137 represents hundreds of millimeters. Light reflected from the marks 126 is transmitted through the lens 127 and reflected from the mirror 129 toward the half-silvered mirror 133, through which a portion of the light passes. The lenses 127 and 135 are adapted to focus images of the marks 126 in a plane disposed on the other side of the half-silvered mirror, and three photodetectors 138, 139 and 141 are disposed adjacent the image plane to detect respectively images of the marks 126 from the three scales 137, 136, and 134. More particularly, the lens 127 is positioned at a distance from the scale exactly equal to its focal length. Similarly, the lens 135 is positioned at a distance from the photodetectors 138, 139 and 141 equal to its focal length. Consequently, the lens 127 will direct light rays from the scale in a collimated or parallel condition towards the lens 135, which will focus these rays at the photodetectors. It is noted that the lenses 127 and 135 invert the image of the scale, so that the scale 137 is imaged at the photodetector 138, and the scale 134 at the photodetector 141.

The effect of the foregoing optical system is to cause an image of the scales 134, 136, and 137 to be moved longitudinally past their respective photodetectors. This effect is the same as though the photodetectors were positioned to detect light directed perpendicularly upward from the scales, and then the photodetectors were moved longitudinally along the scale to detect individual scale marks. To utilize the light source 132 for maximum efficiency, it is preferred that the source be positioned at substantially the focal length of the lens 135. An alternative embodiment consists of three lamps, substituted for the single lamp 132. Slits may be placed in front of the three photodetectors to improve their resolution.

As shown in FIGURE 9, the millimeter scale 134 includes a plurality of spaced relatively wide marks 142, each of which are descriptively numbered in accordance with the numbering of corresponding marks 24. Between each wide mark 142 and the adjacent lower numbered wide mark 142 are disposed a plurality of relatively narrower marks 143. The number of narrow marks 143 is equal to the numerical designation of the highest numbered adjacent wide mark 142. Thus, for example, there are five spaced narrow marks 143 disposed intermediate the wide marks 142 designated as the 5 millimeter and 4 millimeter marks. The lens 127 scans over the scale 134 as depicted in phantom lines in FIGURE 9, and the marks 142 and 143 are sequentially detected by the photodetector 141 which produces an electrical pulse for each mark detected. The wide marks 142 produce a relatively wider and greater amplitude electrical pulse than those produced by the narrow marks 143. The wide marks 142 are disposed generally laterally adjacent their correspondingly numbered marks 24, and as shown in the preferred embodiment each wide mark 142 is at a longitudinal position corresponding to the midpoint between the corresponding mark 24 and the next highest numbered mark 24. Thus, for example, the 6 millimeter wide mark 142 is positioned longitudinally intermediate the 6 and 7 millimeter marks 24.

The scale 136 includes a plurality of narrow marks 144, which are longitudinally positioned intermediate wide marks 142. The number of narrow marks 144 is equal to the ten millimeter digit identifying the particular mark 24. Similarly, the scale 137 includes a plurality of narrow marks 146, also positioned longitudinally intermediate adjacent marks 142, which identify the hundred millimeters digit of the particular mark 24.

Detection of a wide mark 142 serves to trigger the coarse encoder counting units so that the narrow mark pulses subsequently detected by the three detectors 138, 139 and 141 give a direct digital readout of the three most significant digits. FIGURE 9 also shows wide marks 142b and 142c on scales 136 and 137. In the metric system, these serve to provide a binary "meters" code, having a capability of coding up to 4 meters of scale length. In the embodiment shown, the "three meter" code is used to identify a "below-zero" portion of the scale, effectively preventing it from becoming confused with the +999 millimeters portion of the scale. The wide marks on the scales 136 and 137 may be used for other purposes. In the English system, it is convenient to provide fine-graduation marks which are spaced at intervals of .050 inch. A logical straight decimal code presentation would include scales for identifying tenths of inches, inches, and tens of inches. However, each tenths symbol would have to identify two consecutive half-tenths spaces. By utilizing a wide mark in every other space in the central track 136, this ambiguity may be resolved. Wide marks in the outer track 136, may be used to designate "below zero" portions of the scale.

The wide marks 142 also serve to stop the counting of narrow marks. A complete scale must include an extra wide mark 142a at the end of the lowest numbered track.

It will be appreciated that the physical positioning of the lens 127 is not sufficient to provide triggering of the counters by the correct wide mark. It is necessary to provide a logic system to remove ambiguities as to which wide mark is to act as the trigger to provide the correct digital identification of the mark 24 from which the housing scale position is measured by the interpolator.

Coarse encoder logic system

In broad terms, the principle of the coarse encoding logic system is to control triggering the coarse pulse counters at the proper rotational position of the scanning member by gating means responsive to the interpolated scale position as indicated by the interpolator. To illustrate the nature of the ambiguity and the means for solving it, assume that the housing scale position is at 3.250 millimeters. As the lens 127 moves into confrontation with the marks 126, it must be determined whether the 2 millimeter wide mark or the 3 millimeter wide mark is to trigger the coarse pulse counters. For a scale position of 3.250 millimeters the former wide mark must be the trigger, while for a 2.750 millimeter position the latter wide mark must act as the trigger. The instant logic system utilizes the number of counted clock pulses to provide a proportionate delay in gating the trigger circuit, thus removing the ambiguity. Thus, if 750 clock pulses are produced between the start and stop positions, the gating logic delays the trigger circuit sufficiently so that it responds to the 2 millimeter wide mark. If, however, only a small number of clock pulses are produced, as for example indicating a position of 3.250 millimeters, then there is a shorter delay, and the trigger circuit is gated early enough to assure that it responds to the 3 millimeter wide mark.

Figure 13:
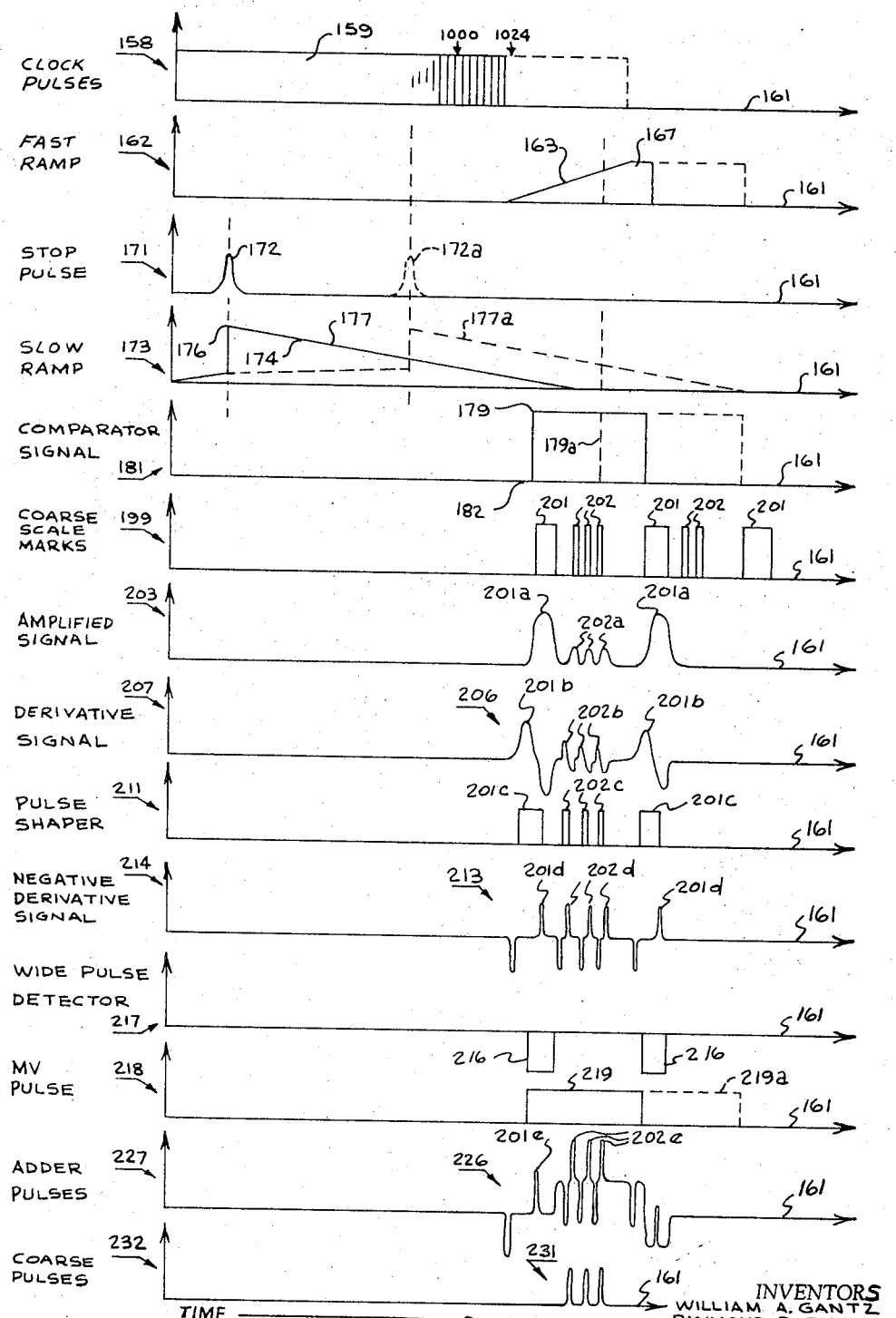
FIGURE 13 is a series of graphs depicting the operation of the system shown in FIGURE 12.

In more detail now, and referring to the block diagram of FIGURE 12, the output from the start pulse amplifier 118 is coupled to a bistable multivibrator 147 as indicated by the arrow 148. The multivibrator 147 has its output coupled to a gate circuit 149 as indicated by the arrow 151, and is adapted to open the gate when triggered by the start pulse. The clock pulse output from the amplifier 116 is fed to the gate 149 as shown by the arrow 152, with the clock pulses being fed to a delay counter 153 when the gate 149 is open as indicated by the arrow 154. The delay counter 153 is adapted to a count a predetermined number of clock pulses and then produce an output signal that is fed to trigger a fast ramp circuit 156 as indicated by the arrow 157. Referring now also to FIGURE 13, a graph 158 depicts the clock pulses 159 in relation to a time axis 151, with zero on the time axis representing occurrence of the start pulse. Another graph 162 depicts the output signal 163 of the fast ramp circuit 156 along the same time axis as in the graph 158.

In the preferred embodiment of the invention, lens 127 is mounted on the scanning member so that it is disposed along a diameter of the scanning member oriented at about 22° to the scale axis when the scanning member is in its start position, as indicated by a diametrical line 164 in FIGURE 9. The delay counter 153 is adapted to count 1024 pulses before triggering the fast ramp circuit 156, and this delay, represented by 61°40′ of rotational position of the lens 127 at 1024 pulses is depicted in FIGURE 9 by the diametrical line 166. As will be shown, the latter position of the lens 127 is the earliest point at which a wide mark 142 can be detected to trigger the counting circuits. The signal 163 produced by the fast ramp circuit 156 preferably is a ramp voltage signal which reaches a maximum and then is level as indicated by the flat portion 167 of the signal 163 in the graph 162 of FIGURE 13. The ramp circuit 156 is adapted so that the ramp portion of the signal 163 reaches the maximum during a time period corresponding to about 4°15′ of rotation of the scanning member beyond the position indicated by the line 166. An angle of 4°15′ causes a displacement of approximately one millimeter at the center of lens 127. It is noted that in FIGURE 9 the lens 127 is being rotated about a point 170, which corresponds to the position of the scanning member rotational axis 27. The point 170 is at a scale position of about 2.250 millimeters, thus the housing scale position is at about 2.750 millimeters.

The output from the stop pulse amplifier 123 is coupled to a slow ramp circuit 168 as depicted in FIGURE 12 by the arrow 169, and serves to trigger the circuit 168 at the instant the stop pulse occurs. The graph 171 in FIGURE 13 depicts the occurrence of the stop pulse 172 along the same time axis as the other graphs, and the graph 173 depicts the output signal 174 of the slow ramp circuit 168. In the preferred embodiment of the invention the slow ramp signal 174 is a voltage having a maximum 176 produced by the occurrence of the stop pulse, at which instant the signal 174 becomes a relatively slowly declining ramp voltage 177.

The rates of incline of the ramp 163 and decline of the ramp 174 are selected so that for a stop pulse at time zero the slow ramp voltage will reach zero at the occurrence of the 1024 clock pulse, i.e. when the fast ramp begins its incline, and so that for a stop pulse at the instant of clock pulse 1000 the slow ramp voltage will drop below that of the fast ramp at about the time the fast ramp reaches its maximum.

The outputs of the ramp circuits 145 and 168 are both coupled into a voltage comparator circuit 178 designed to produce a step function output signal 179 at the instant the fast ramp voltage becomes greater than that of the slow ramp. The signal 179 is depicted in the graph 181 of FIGURE 13, and is seen to be initiated at the point 182 on the time axis for the illustrated stop pulse 172. As indicated by an arrow 183, the signal 179 from the comparator circuit 178 is coupled to an "AND" logic circuit 184.

The comparator circuit signal serves basically to initiate the operation of detecting the wide mark 142, and subsequent counting of narrow marks. Each of the photodetectors 138, 139 and 141 is coupled respectively to an amplifier 186, 187 and 188, which in turn ultimately feed to decimal counting units 189, 191, and 192 for counting of the respective narrow marks 146, 144 and 143. The number of narrow marks counted is fed respectively to the display unit 122 for indicating the digits representing hundreds, tens, and units. The output of the amplifier 186 in addition to being coupled to the counting unit 189 also is coupled to a wide pulse detector circuit 193 as indicated by the arrow 194. The circuit 193 is adapted to produce an output pulse upon detection of a pulse from the amplifier 186 corresponding to one of the wide marks 142. As noted hereinabove, the wide marks produce a wider and greater amplitude electrical pulse than do the narrow marks, and the circuit 193 contains a discriminator which responds only to the wide mark pulses. The output pulse from the circuit 193 is coupled to the "AND" circuit 184 as indicated by the arrow 196. The circuit 184 is adapted to provide an output pulse which is coupled to a bistable multivibrator 197 as indicated by an arrow 198. The output pulse of the circuit 184 occurs only upon the simultaneous presence of signals from both the comparator circuit 178 and the wide pulse detector 193. Circuitry is provided as described hereinafter to initiate the counting of narrow marks after the multivibrator 197 is triggered by the circuit 184.

The detection of marks 126 in the millimeter scale 134 by the lens 127 is depicted diagrammatically by the graph 199, wherein the pulses 201 represent light detected from wide marks 142 and the pulses 202 represent light detected from narrow marks 143. The output of the amplifier 186 is depicted in the graph 203, with the electrical pulses 201a and 202a representing the respective light pulses. The electrical output from the amplifier 186 is fed to a differentiating circuit 204, which produces a signal 206 as depicted in the graph 207. The signal 206 represents the derivative of the pulses in the graph 203, and includes positive pulses 201b which correspond to the positive slopes of pulses 201a, and consequently occur earlier in time than the peaks of the pulses 201a. Similar positive pulses 202b represent the pulses 202a but likewise are earlier in time. The output from the differentiating circuit 204 is coupled to a pulse shaping circuit 208 as indicated by the arrow 209, with the output of the circuit 208 being shown in the graph 211. The circuit 208 may for example comprise a Schmitt trigger circuit responsive to the axis crossings of the derivative signal 206, and the signal from the circuit 208 consists in the shaped pulses 201c and 202c which correspond to the positive pulses 201b and 202b. The output from the shaper circuit 208 is coupled to a second differentiating circuit 212, which is adapted to produce a signal 213 as depicted in the graph 214 and which corresponds to the negative derivative of the pulses 201c and 202c. As seen in the graph 214, the signal 213 includes positive spike pulses 201d which coincide with the end of the pulses 201c, and positive spike pulses 202d which are taken herein to correspond to the light pulses 202.

The output pulses 216 from the wide pulse detector 193 is depicted in the graph 217 as being a negative square pulse coincident in time with the pulses 201. The output from the bistable multivibrator 197 is depicted in the graph 218, and is seen to have two states, either zero or a constant voltage signal 219. The latter signal is initiated upno a pulse from the "AND" circuit 184, and the multivibrator 197 returns to its zero voltage upon a subsequent pulse from the circuit 184.

The output signals from the circuits 193, 197, and 212 are all coupled into an adder circuit 221, as depicted by the respective arrows 222, 223, and 224. The output of the adder circuit is depicted in the graph 227 which is exactly equal to the signals 213, 216, and 219 when added together. It is seen that the negative signal 216 and the signal 219 are adapted exactly to balance one another, so that a pulse 201e is produced which corresponds exactly to the spike pulse 201d. The pulse 216 terminates prior to occurrence of the spike pulses 202d, so that pulses 202e are produced corresponding to the pulses 202d but at a uniformly higher level than the pulses 201e. The output of the adder 221 is coupled to a discriminator circuit 228 as shown by the arrow 229, the latter circuit being adapted to respond only to the spike pulses 202e which are above a predetermined level, which level is above the peak of the spike pulses 201e. Consequently the discriminator output signal 231 which is depicted in the graph 232 is seen to consist of a plurality of pulses 202f which correspond in number exactly to the number of narrow mark pulses 202. The output of the discriminator circuit 228 is coupled to the counting unit 189 as indicated by arrow 233, so that the number of narrow marks counted is fed to the display unit 122 to indicate the proper number representing the millimeters digit. The outputs of the amplifiers 187 and 188 are coupled respectively to pulse shapers 234 and 236, which are similar to the shaper 208, and the output signals from the shapers 234 and 236 are coupled respectively to negative differentiators 237 and 238 which produce spike pulses similar to that from the circuit 212. The output from the circuits 237 and 238 are coupled respectively to adders 239 and 241, which add in the signal 219 from the multivibrator circuit 197. Consequently, the output from the adders 239 and 241 consists of spike pulses at a higher level than spike pulses caused by narrow marks when there is no signal 219, and these outputs are coupled to discriminators 242 and 243 which detect only the high level spike pulses. The output from the discriminators 242 and 243 are coupled respectively to the counting units 191 and 192, and the pulses counted thereby are fed to the display unit 122 as already described. As noted above, wide marks 142b and 142c may be provided on the coarse scales 136 and 137 to accomplish various indicating functions, and accordingly wide pulse discriminator circuits 244 and 246 are coupled between the amplifiers 187 and 188 and their respective adders 239 and 241. The circuits 244 and 246 are similar to the circuit 193 as described hereinabove.

From the foregoing it will be seen that the time at which the comparator signal is initiated depends on the number of clock pulses counted between the start and stop pulses. That is, if the stop pulse occurs relatively quickly after the start pulse, then the comparator signal will be initiated at a relatively early portion of the fast ramp signal 163. If the stop pulse occurs after a large number of clock pulses are counted, as indicated for example by the stop pulse 172a shown in dotted lines in the graph 171, then the comparator signal 179a is initiated at a relatively later portion of the fast ramp 163 as a result of the delayed slow ramp signal 177a.

In the event of the later stop pulse 172a, the "AND" circuit 184 is not operated until the second mark 201 shown in the graph 199 is detected. Consequently, the multivibrator 197 is not operated until the second illustrated pulse 201, and therefore the narrow marks will not be counted until after this second wide mark pulse. In the example described above the stop pulse 172 would represent an interpolated position of 250 microns corresponding to the position of 3.250 millimeters, and accordingly the coarse encoding system would respond to the first illustrated wide mark 201 whereby the three narrow mark pulses 202 would be counted and hence the number three would be indicated for the millimeters digit. The absence of narrow marks on the scales 136 and 137 would result in zeros for the tenths and centimeters digits. If the later stop pulse 172a occurred, then the position interpolated would, for example, correspond to 750 microns, and therefore only the two narrow mark pulses coming after the second illustrated wide mark pulse 201 would be counted. The position of 2.750 millimeters therefore would be indicated.

It is noted that the second pulse from the "AND" circuit 184 serves to return the multivibrator 197 to its zero state. The multivibrator 197 is coupled to a reset pulse circuit 247 as indicated by the arrow 248, and the reset circuit couples to the delay counter 153, and the multivibrator 147 to return these circuits to their condition prior to the occurrence of the start pulse when the multivibrator 197 returns to zero. They are therefore set to perform the same functions again upon the occurrence of the next start pulse and subsequent signals as described. The resetting of the delay counter causes the resetting of the fast ramp. The slow ramp is reset by the next stop pulse.

It will be appreciated that the circuits represented by block diagrams in FIGURE 12 can be of any conventional design of which many are known to those skilled in the art. Consequently, it is unnecessary to set forth herein any particular electrical schematic diagram for the circuits to perform the well known separate functions described hereinabove.

Operation

In operating the instant measuring apparatus the housing 23 is suitably mounted for longitudinal movement in relation to the planar scale member as may be required for the various functions of tool operation, photogrammetry, and the like. The housing is then moved to various positions in relation to the scale, which positions are sought to be precisely identified. The scanning member rotates continuously, preferably at a rate of about 10 times per second. Consequently, a start pulse is initiated every 100 milliseconds, and clock pulses are fed to a decimal display unit for readout at such intervals. Likewise, the coarse encoder system functions to provide a simultaneous readout in response to each revolution of the scanning member.

Traverse of the housing is seen in no way to affect the readout of the housing scale position, since the latter is determined not by the event of housing traversal but rather by the scanning member movement in relation to the scale for any given housing position. Because of the relatively fast rotational speed of the scanning member, approximate measurements can be indicated on the fly for low speed traversal of the housing. A precise determination of the housing scale position can be made when the housing is stationary in relation to the scale. Because a measurement and readout is made ten times a second, possible spurious readings caused by power failure or other interference are immediately discovered.

The electronics circuitry of the present invention is seen to be readily adapted for use with more than one measuring head. More particularly, where measuring heads are to be used on two or more axes, they all can be fed to the same logic circuitry and display unit. Simple operation of a switch selectively determines which head is to be coupled into the circuitry and is to provide the readout on the display unit.

It will be appreciated that the accuracy in measuring distances along the scale 22 is dependent on two considerations. One of these is the resolution of the interpolator, which as shown is capable of one micron measurements. The other consideration is the accuracy of the scale itself, since the interpolator only measures the distance of the housing scale position to a reference mark. With regard to the scale, it is possible with present manufacturing techniques to provide the reference marks 24 at one millimeter spacings with an accuracy of about ± two microns for a length of one meter.

We claim:

1. Measuring apparatus comprising a scale having a reference mark, a housing mounted for movement relative to said scale and having different positions corresponding to positions on said scale, scanning means movably mounted on said housing having a range of positions relative to said housing each of which corresponds to a position on said scale and which include first and second positions corresponding respectively to the scale position of said housing and the position of said mark, first indicating means for indicating when said scanning means is at said first position thereof, second indicating means for indicating when said scanning means is at said second position thereof, measuring means for determining the extent of movement of said scanning means relative to said housing, and third indicating means responsive to said first and second means and measuring means for indicating the extent of movement of said scanning means between said first and second positions thereof whereby the distance of said scale position from said mark can be determined.

2. Apparatus as described in claim 1 wherein said scanning means includes means for creating an optical image of said mark at a position spaced from said scale which image changes position in accordance with movement of said scaning means, said image being disposed at a predetermined position when said scanning means is in said second position thereof, and said second indicating means including optical means for detecting the presence of said image when in said predetermined position thereof.

3. Apparatus as described in claim 1 wherein said scanning means includes a member mounted for rotation on said housing and means for continuously rotating said member, said measuring means including means defining a plurality of spaced parallel lines disposed on said rotating member and means for indicating each time one of said lines passes a predetermined radial position relative to the axis of said rotating member.

4. Digital measuring apparatus comprising a generally elongated planar scale member having a plurality of longitudinally spaced interpolating scale reference marks, a housing mounted for selective longitudinal movement in spaced confronting relation with said scale and having different longitudinal positions corresponding to positions on said scale, a scanning member mounted on said housing for rotation about an axis generally perpendicular to said scale member, means for continuously rotating said scanning member, said scanning member having a range of positions relative to said housing for each position thereof which correspond to longitudinal positions on said scale, first indicating means for producing an electrical start pulse when said scanning member is at a start position thereof corresponding to the scale position of said housing, second indicating means for producing an electrical stop pulse when said scanning member is at a position corresponding to the position of a reference mark proximate one side of said housing's scale position, means defining a plurality of spaced parallel lines disposed on said rotating member, means for producing an electrical clock pulse each time one of said lines passes a predetermined radial position relative to the axis of said scanning member, first counting means for counting said clock pulses, said radial position being rotationally oriented so that said counting means provides a digital representation of the longitudinal scale position of said scanning member, means coupling said start pulse to said counting means to start the counting of said clock pulses and means coupling said stop pulse to said counting means to stop the counting of said clock pulses whereby the number of pulses counted indicates the scale distance between said proximate reference marks and housing scale position.

5. Measuring apparatus comprising a generally planar scale member having a plurality of longitudinally spaced reference marks, a housing mounted for selective longtudinal movement in spaced confronting relation with said scale and having different longitudinal positions corresponding to positions on said scale, a scanning member mounted on said housing for rotation about an axis generally perpendicular to said scale member, means for continuously rotating said scanning member, said scanning member having a range of positions relative to said housing for each position thereof which corresponds to longitudinal positions on said scale, first indicating means for indicating when said scanning member is at a first position thereof corresponding to the scale position of said housing, means mounted on said scanning member for creating an optical image of a mark proximate said scale position which image rotates in accordance with the movement of said scanning member, said scanning member having a second position thereof corresponding to the position of said mark with said image being disposed at a predetermined position when said scanning member is at said second position thereof, second indicating means for optically detecting the presence of said image when in said predetermined posiiton thereof, means provided on said scanning member defining a plurality of regularly spaced parallel elongated transparent regions having opaque regions disposed therebetween, said regions being disposed in a transverse plane relative to the axis of rotation of said scanning member, illumination means positioned for transmitting light through said transparent regions, detecting means for detecting light transmitted through said transparent regions at a predetermined radial position relative to the axis of said scanning member, and shutter means for permitting light detection only when a transparent region confronts said radial position whereby each transparent region moving past said radial position is indicated by said detecting means.

6. The combination of claim 5 further including electrical pulse counting means, pulse forming means coupled to said counting means and adapted to form an electrical pulse each time said detecting means indicates the passing of a transparent region, one of said first and second indicating means being adapted to give a start electrical pulse to said counting means, and the other of said first and second indicating means being adapted to give a stop electrical pulse to said counting means whereby said counting means counts the number of pulses initiated by said pulse forming means during the interim between said start and stop pulses.

7. The combination of claim 5 wherein said shutter means includes a light reflecting surface positioned on the opposite side of said transparent regions from said illuminations means, said reflecting surface being adapted to superimpose on said regions an image of said regions whereby as said regions move with said scanning member said superimposed image regions move transversely relative to said regions to alternately reflect light back through said transparent regions and block such reflected transmission, and said detecting means including a light detector positioned on the opposite side of said regions from said surface to detect said alternating transmission of light through said regions.

8. The combination of claim 7 wherein said reflecting surface is planar, and wherein there is further provided a focusing lens disposed between said surface and said regions, said detector being positioned to detect the focused image of said illumination means.

9. Digital measuring apparatus of the character described comprising, in combination, a generally planar scale member having a generally elongated scale including a plurality of longitudinally spaced transversely extending reflective reference lines, a housing mounted for selective longitudinal movement in spaced confronting relation to said scale, a rotating member mounted on said housing for rotation about an axis generally perpedicular to said planar member, means for continuously rotating said rotating member, means for providing light directed onto said scale, a lens mounted on said housing for creating an optical image of one of said reference lines, a refracting member mounted on said rotating member and interposed in the path of light between one said line and its image for varying the position of said image relative to said housing in accordance with the movement of said rotating member, first light detecting means for indicating the presence of said image at a predetermined reference position thereof in relation to said housing, means for forming a first electrical pulse in response to said first light detecting means, means for indicating when said rotating member is at a predetermined rotational position thereof, means responsive to said last named means for forming a second electrical pulse, a planar clock pulse member mounted on said rotating member for rotation therewith and disposed in a plane generally perpendicular to said rotational axis, said clock pulse member having a plurality of alternating coplanar opaque and transparent strips of substantially equal width, a planar mirror mounted on said housing in a plane parallel to said clock pulse member in position to confront one side thereof as it passes by said mirror in axially spaced relation therewith, a clock lens interposed between said mirror and the plane of said clock pulse member and spaced axially from said latter member at substantially the focal distance of said clock lens, means for providing light directed through said clock pulse member and clock lens toward said mirror, light detecting means positioned to detect light reflected from said mirror and transmitted back through said clock lens and clock pulse member, means for forming a third electrical pulse for each pulse of said reflected light detected by said last named light detecting means, pulse counting means for counting said third pulses, means coupling said second pulse to said pulse counting means for initiating the counting of said third pulses, and means coupling said first pulse to said pulse counting means for stopping said counting on said third pulses.

10. Digital measuring apparatus of the character described comprising, in combination, a generally planar scale member having an elongated scale including a plurality of longitudinally spaced transversely extending reflective reference lines, a housing mounted for selective longitudinal movement in spaced confronting relation to said scale, a generally tubular member mounted for rotation about an axis disposed perpendicular to said planar member, an eccentric refracting member having spaced parallel surfaces mounted coaxially adjacent one end of said tubular member with said surfaces being angularly disposed in relation to said rotational axis and with one of said surfaces being positioned in spaced confronting relation with said scale, means for continuously rotating said tubular member about said axis, means for providing light directed through said tubular member and refracting member onto said scale, a focusing lens mounted on said housing for forming an image of said scale in a plane spaced from said scale, said refracting member being interposed between said scale and the image plane therefor for varying the position of a reference line image in accordance with the movement of said tubular member, first light detecting means for indicating the presence of a reference line image at a predetermined reference position thereof in relation to said housing, said light detecting means including means for forming a first electrical pulse when indicating said presence of an image, means for indicating when said tubular member is at a predetermined rotational position thereof, means responsive to said last named means for forming a second electrical pulse, a planar clock pulse member mounted transversely on said tubular member for rotation therewith and extending radially beyond said tubular member, said clock pulse member having a plurality of alternating coplanar opaque and transparent strips of substantially equal width, a planar mirror mounted on said housing in a plane parallel to said clock pulse member and positioned to confront one side thereof as is passes by said mirror in axially spaced relation therewith, a focusing clock lens interposed between said mirror and the plane of said clock pulse member and spaced axially from said latter member at substantially the focal distance of said clock lens, means for providing light directed through said clock pulse member and clock lens towards said mirror, light detecting means positioned to detect light reflected from said mirror and transmitted back through said clock lens and clock pulse member for forming a third electrical pulse for each pulse of said reflected light, said refracting member being oriented in relation to said lines and said clock lens so that the number of lines counted is a linear function of the distance between said reference line image and said predetermined reference position, pulse counting means for counting said third pulses, means coupling said second pulse to said pulse counting means for initiating the counting of said third pulses, and means coupling said first pulse to said first pulse counting means for stopping said counting of said third pulses.

11. The combination of claim 10 further including mounting means for selectively varying the radial and rotational position of said clock lens relative to said rotational axis.

12. The combination of claim 10 wherein said means for indicating said predetermined rotational position of said tubular member includes, means defining a first slit provided on said housing disposed in a plane generally transverse to said rotational axis, means for providing light directed through said slit in a direction generally parallel to said axis, a second focusing lens mounted on said tubular member for rotation therewith and positioned to move across the path of said light transmitted through said first slit, means defining a second slit provided said housing and positioned to register with an image of said first slit formed by said second lens for said predetermined position of said tubular member, said means for forming said second electrical pulse indicating second light detecting means provided on said housing for indicating the presence of an image of light from said first slit in alignment with said second slit.

13. Measuring apparatus comprising a scale having a first plurality of spaced reference marks; a member mounted for movement relative to said scale and having different positions corresponding to positions on said scale, scanning means movably mounted on said member having a range of positions relative to said member each of which corresponds to a position on said scale and which include first and second positions corrrespond respectively to the scale position of said member and the position of one mark proximate said scale position, first indicating means for indicating when said scanning means is at said first position thereof, second indicating means for indicating when said scanning means is at said second position thereof, measuring means for determining the extent of movement of said scanning means relative to said member, third indicating means responsive to said first and second means and said measuring means for indicating the extent of movement of said scanning means between said first and second positions thereof whereby the distance of said scale position from said one mark can be determined, a second plurality of marks provided on said scale adjacent said first marks with each of said second marks representing one of said first marks, detecting means provided with said scanning means for detecting said second marks, logic means coupled to said third indicating means for determining which of said second marks detected by said scanning means corresponds to said one mark, and fourth indicating means coupled to said detecting means and logic means for indicating which of said first mark is said one mark.

14. Measuring apparatus comprising a generally planar scale member having a generally elongated interpolating scale including a first plurality of longitudinally spaced reference marks, a housing mounted for selective longitudinal movement in spaced confronting relation to said scale member and having different positions corresponding to positions on said fine scale, a rotating member mounted on said housing for rotation about an axis generally perpendicular to said scale member, means for continuously rotating said rotating member, said rotating member having a range of positions relative to said housing for each position thereof which correspond to longitudinal positions on said scale, first indicating means for indicating when said rotating member is at a first position thereof corresponding to the scale position of said housing, second indicating means for indicating when said rotating member is at a second position thereof corresponding to the position of a reference mark disposed proximate said scale position on one side thereof, measuring means for determining the extent of movement of said scanning means relative to said housing, third indicating means coupling said first and second means with said measuring means for indicating the extent of movement of said scanning means between said first and second positions thereof whereby the distance of said scale position from said proximate mark can be determined, said scale member having a coarse encoding scale including a second plurality of longitudinally spaced reference marks disposed in a row generally parallel to and adjacent said interpolating scale, said coarse scale including a plurality of first marks disposed at predetermined longitudinally spaced positions and each corresponding to one of said fine scale marks, said coarse scale further including a plurality of second marks distinguishable in configuration from said first marks and disposed intermediate said first marks with said second marks adjacent one side of each first mark being representative of the interpolating scale mark corresponding to the latter first mark, detecting means provided on said rotating member for scanning along said coarse scale and sequentially detecting a first mark and a second mark, fourth indicating means responsive to said detecting means for indicating the fine scale marks represented by said second marks, logic means responsive to said third indicating means for actuating said fourth indicating means upon detection of the first mark corresponding to said proximate fine scale mark, said fourth indicating means indicating which one of said interpolating scale marks is said proximate mark.

15. Digital measuring apparatus comprising a generally elongated planar scale member having a plurality of longitudinally spaced fine scale reference marks, a housing mounted for selective longitudinal movement in spaced confronting relation with said scale member and having different longitudinal positions corresponding to positions on said scale, a scanning member mounted on said housing for rotation about an axis generally perpendicular to said scale member, means for continuously rotating said scanning member, means for measuring the distance from said housing's scale position to a fine scale reference mark proximate one side of said scale position, said scale member having a plurality of longitudinally spaced coarse scale reflective reference marks aligned in a row generally parallel and adjacent to said interpolating scale marks, said second plurality including a plurality of first marks each longitudinally spaced apart substantially the same distance as said interpolating scale marks and each said first mark corresponding to one of said interpolating scale marks, said second plurality further including a plurality of second marks distinguishable in configuration from said first marks and disposed in each region intermediate said first marks, said second marks varying in number in each said region, said second marks in each said region being a digital representation of the interpolating scale mark corresponding to the first mark proximate one side of each said region, a light source mounted on said housing and positioned to direct light on to said course scale, a focusing lens mounted on said rotating scanning member and radially positioned thereon to pass in a circular path over a portion of said coarse scale marks and to form images of the latter marks in a plane spaced from said scale, a light detector positioned adjacent said latter image plane for detecting said coarse scale marks as said lens focuses them in said plane, said detector producing first electrical pulses in response to detection of a first mark and electrically distinguishable second electrical pulses in response to detection of said second marks, counting means coupled to said detector for counting said second pulses, trigger means coupled to said detector and responsive to detection of one of said first pulses for actuating said counting means to count subsequent second pulses until another of said first pulses is detected, means for actuating said trigger means in response to the distance measured between said scale position and said proximate mark whereby the position of said scanning member when said trigger means is actuated varies in accordance with said distance, said actuating means causing detection of a first mark corresponding to said proximate mark and said second pulses subsequently counted being a digital representation of said proximate mark.

16. A device for determining the position of a sensing head with reference to a linear scale in which the scale is marked with a plurality of precision spaced parallel reference lines, the improvement comprising means mounted on said head sensitive to receive information from said scale indicative of the presence and absence of reference lines, means moving said receiving means in an information receiving scan path forming a substantially circular plane at said scale through the area of the reference lines, detector means mounted on said head and activated to provide an electrical signal by information received by said receiving means, signal generating means operatively connected to said receiving means to provide a signal having a varying characteristic for each angular position of the reading scan in its path relative to said head, reference position detecting means to provide a reference signal when said receiving means is at a fixed reference position to said head, computer means connected to said detector means, said reference position detecting means and said signal generating means to provide an output signal which is additive of the signal produced by said signal means between the reference position of said signal means and the point of detection of the presence of a reference line by said detector means, said signal means controlled to provide an output signal of a character which provides increments of value for each interval of rotation of said receiving means which provides an increment of scan movement equivalent to a fixed predetermined increment of linear movement of the scan relative to the linear axis of said scale.

17. A device acording to claim 16 and wherein said signal generating means includes a pulse generator operable to vary the interval between pulses in synchronization with the movement of the receiving means to provide a sequence of varying pulse rates in accordance with the instantaneous angular position of the scan in its path relative to said head.

18. A device acording to claim 16 and wherein said signal generating means includes a pulse generator comprising a ruled disk having straight parallel lines interposed between transparent lines, means rotating said disk in synchronization with said receiving means, means for reflecting the projected light back in its own path and through the disk, and a detector mounted to receive the light reflected back through the disk to provide an electrical signal upon said light beam being sequentially interrupted by the markings on said disk.

19. A device according to claim 16 and wherein said receving means includes an optical element mounted at the center of the scan path and formed to refract light from the scan path to the center thereof, and said detector means comprising a photo-electric element mounted to receive light refracted from the center of said optional element.

20. A device according to claim 16 and wherein said reference position detecting means includes a photo detector and disk mounted for concurrent rotation with said receiving means, an aperture formed in said disk to pass light to said photo detector upon said disk and receiving means being at a predetermined angular position relative to said head.

21. A device according to claim 16 and wherein said scale is formed with a plurality of reference line tracks, a first one of said reference line tracks being registered with said scan path, a second of said reference tracks being disposed adjacent said first track of reference lines and outside of said scan path, said second reference lines including first spaced indicia and second indicia between said first indicia, second track reading means mounted on said head and positioned to read said second indicia, counter means connected to said second track reading means and operable to totalize the number of second indicia appearing between pairs of first indicia, and second track counter control means operable to read said first indicia and responsive to one first indicia of a pair to start operation of said counter means and responsive to a second of said first indicia to stop operation of said counter means.

22. A device according to claim 16 and wherein said counter control is connected in controlled relation to said computer and operable to cause said counter means to be operable to selectively start counting at one or the other of two first indicia in accordance with the totalized count value indicated by said computer means.

References Cited

UNITED STATES PATENTS

| | | | |
|---|---|---|---|
| 2,651,771 | 9/1953 | Palmer | 250—233 |
| 3,024,986 | 3/1962 | Strianese et al. | 250—233 |
| 3,054,901 | 9/1962 | Davidson | 250—236 |
| 3,153,111 | 10/1964 | Barber et al. | 88—14 |
| 3,222,526 | 12/1965 | Franck et al. | 250—203 |
| 3,230,827 | 1/1966 | De Neergaard | 250—233 |
| 3,281,605 | 10/1966 | Davidson | 250—233 |

WALTER STOLWEIN, *Primary Examiner.*

U.S. Cl. X.R.

250—233